US012431535B2

(12) United States Patent
Ji et al.

(10) Patent No.: US 12,431,535 B2
(45) Date of Patent: Sep. 30, 2025

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG ENERGY SOLUTION, LTD., Seoul (KR)

(72) Inventors: Su Hyeon Ji, Daejeon (KR); Chul Haeng Lee, Daejeon (KR); Kyoung Ho Ahn, Daejeon (KR); Min Jung Kim, Daejeon (KR); Sol Ji Park, Daejeon (KR); Jun Hyeok Han, Daejeon (KR); Won Kyung Shin, Daejeon (KR); Won Tae Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 570 days.

(21) Appl. No.: 17/800,697

(22) PCT Filed: Jan. 28, 2022

(86) PCT No.: PCT/KR2022/001541
§ 371 (c)(1),
(2) Date: Aug. 18, 2022

(87) PCT Pub. No.: WO2022/164247
PCT Pub. Date: Aug. 4, 2022

(65) Prior Publication Data
US 2023/0361344 A1    Nov. 9, 2023

(30) Foreign Application Priority Data

Jan. 28, 2021  (KR) .................. 10-2021-0012449
Jan. 28, 2021  (KR) .................. 10-2021-0012450
Jan. 28, 2021  (KR) .................. 10-2021-0012451
Jan. 27, 2022  (KR) .................. 10-2022-0011966

(51) Int. Cl.
*H01M 10/0567*    (2010.01)
*H01M 10/0568*    (2010.01)
*H01M 50/46*      (2021.01)

(52) U.S. Cl.
CPC ... *H01M 10/0567* (2013.01); *H01M 10/0568* (2013.01); *H01M 50/46* (2021.01); *H01M 2300/0025* (2013.01)

(58) Field of Classification Search
CPC ......... H01M 10/0525; H01M 10/0567; H01M 10/0568; H01M 2300/0025; H01M 2300/0042; H01M 50/46; Y02E 60/10
See application file for complete search history.

(56) References Cited

U.S. PATENT DOCUMENTS

2002/0114997 A1   8/2002   Lee et al.
2003/0091933 A1   5/2003   Kunita
2004/0059016 A1   3/2004   Nishikitani et al.
2011/0081582 A1   4/2011   Park et al.
2011/0143174 A1   6/2011   Kim et al.
2012/0244419 A1   9/2012   Kwak et al.
2013/0136998 A1   5/2013   Hwang et al.
2013/0344398 A1   12/2013  Kim et al.
2014/0072865 A1   3/2014   Suh et al.
2015/0072247 A1   3/2015   Cho et al.
2017/0288268 A1   10/2017  Kim et al.
2019/0006700 A1   1/2019   Makino et al.
2020/0153045 A1   5/2020   Choi et al.
2020/0203763 A1   6/2020   Armand et al.
2021/0036365 A1   2/2021   Kim et al.
2021/0218058 A1   7/2021   Ahn et al.
2021/0389671 A1   12/2021  Kaneko et al.
2022/0089548 A1   3/2022   Kim et al.

FOREIGN PATENT DOCUMENTS

CN       110945706 A       3/2020
CN       111357144 A       6/2020
EP       1 249 731 A2      10/2002
JP       2002-289254 A     10/2002
JP       2008-127498 A     6/2008
KR       10-2002-0057569 A 7/2002
KR       10-2011-0036444 A 4/2011

(Continued)

OTHER PUBLICATIONS

Office Action dated Oct. 16, 2024 issued in Korean Patent Application No. 10-2022-0011966.
Extended European Search Report dated Jul. 19, 2024 issued in European Patent Application No. 22746273.6.
International Search Report (with partial translation) and Written Opinion dated May 12, 2022, for corresponding International Patent Application No. PCT/KR2022/001541.

(Continued)

*Primary Examiner* — Victoria H Lynch
(74) *Attorney, Agent, or Firm* — Morgan, Lewis & Bockius LLP

(57) ABSTRACT

The present disclosure provides a non-aqueous electrolyte solution for a lithium secondary battery, which may form a robust solid electrolyte interphase (SEI), and a lithium secondary battery in which battery performance is improved by including the same. Specifically, the non-aqueous electrolyte solution for a secondary battery includes a lithium salt, a non-aqueous organic solvent, a first additive, and a second additive, wherein the non-aqueous electrolyte solution for a secondary battery may include an oligomer including a repeating unit derived from a monomer represented by Formula 1 and a repeating unit derived from a monomer represented by Formula 2 as the first additive, and may include at least one selected from the group consisting of a nitrile-based compound, a lithium salt compound, and a cyclic carbonate compound as the second additive.

16 Claims, No Drawings

(56) References Cited

FOREIGN PATENT DOCUMENTS

| | | |
|---|---|---|
| KR | 10-2011-0067565 A | 6/2011 |
| KR | 10-2012-0109407 A | 10/2012 |
| KR | 10-2013-0058403 A | 6/2013 |
| KR | 10-2014-0032918 A | 3/2014 |
| KR | 10-2015-0030031 A | 3/2015 |
| KR | 10-2015-0050149 A | 5/2015 |
| KR | 10-2015-0083363 A | 7/2015 |
| KR | 10-2016-0036810 A | 4/2016 |
| KR | 10-2017-0044136 A | 4/2017 |
| KR | 10-2017-0114389 A | 10/2017 |
| KR | 10-2018-0035555 A | 4/2018 |
| KR | 10-2019-0017477 A | 2/2019 |
| KR | 10-2019-0054920 A | 5/2019 |
| KR | 10-2020-0029373 A | 3/2020 |
| KR | 10-2020-0089624 A | 7/2020 |
| KR | 10-2021-0007345 A | 1/2021 |
| WO | 2020/184343 A1 | 9/2020 |

OTHER PUBLICATIONS

Office Action issued on Apr. 11, 2025 in corresponding Chinese Patent Application No. 202280002749.2.

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

This application claims priority from Korean Patent Application Nos. 10-2021-0012449, 10-2021-0012450, and 10-2021-0012451, filed on Jan. 28, 2021, and 10-2022-0011966, filed on Jan. 27, 2022, the disclosures of which are incorporated by reference herein.

TECHNICAL FIELD

The present disclosure provides a non-aqueous electrolyte solution for a lithium secondary battery and a lithium secondary battery including the same.

BACKGROUND ART

Dependence on electrical energy is gradually increasing in modern society, and, accordingly, production of the electrical energy has been further increased. In order to address environmental issues that arise during this process, renewable energy generation is in the spotlight as a next-generation power generation system.

With respect to renewable energy, since it exhibits intermittent power generation characteristics, a large-capacity power storage device is indispensable to supply power stably. A lithium-ion battery is in the spotlight as a device exhibiting the highest energy density which is currently commercialized among power storage devices.

The lithium-ion battery is composed of a positive electrode formed of a transition metal oxide containing lithium, a negative electrode capable of storing the lithium, an electrolyte solution that includes an organic solvent containing a lithium salt, and a separator.

Since the positive electrode among these components stores energy through a redox reaction of transition metal, this results in the fact that a transition metal oxide must be essentially included in the positive electrode. Also, the negative electrode includes lithium, graphite, and/or a silicon-based active material which may express charge and discharge capacities through electrochemical oxidation/reduction reactions at 0.2 V or 0.5 V (vs. (Li/Li$^+$)) or less, respectively.

Since operating voltage ranges of the lithium, graphite, and silicon-based active material are lower than an electrochemical stability window of an organic non-aqueous electrolyte solution, the organic non-aqueous electrolyte solution becomes electrochemically unstable in the operating voltage ranges of the negative electrode active material. As a result, while reductive decomposition of the non-aqueous electrolyte solution precedes, a passivation layer which is a reductive decomposition product of the non-aqueous electrolyte solution, that is, a solid electrolyte interphase (SEI) is formed on a surface of the electrode.

The SEI is a passivation layer with high lithium ion conductivity but low electron conductivity, wherein it not only suppresses additional reductive decomposition of the electrolyte solution, but also has a characteristic that enables operation of the lithium-ion battery because it has a characteristic that allows lithium ions to be transmitted but inhibits electron transmission.

However, since the SEI is damaged when exposed to high temperatures for a long time to lose its passivation ability and, as a result, lithium and electrons in a cell are additionally consumed while additional electrolyte solution decomposition occurs, degradation of electrochemical performance of the cell or a thermal runaway due to an increase in internal temperature of the cell is caused.

Also, a reduction in performance of the positive electrode occurs as a positive electrode active material structurally collapses during repeated charge and discharge. That is, metal ions, which have been dissolved from a surface of the positive electrode during structural collapse of the positive electrode, are electro-deposited on the negative electrode to degrade performance of the battery. This battery performance degradation phenomenon tends to further increase when a potential of the positive electrode is increased or when the battery is exposed to high temperatures.

In order to improve these various problems, there is an urgent need to develop a non-aqueous electrolyte solution for a lithium secondary battery which may have an effect of improving performance and stability of a secondary battery by forming a robust film on a surface of an electrode even in a high-temperature environment.

DISCLOSURE OF THE INVENTION

Technical Problem

An aspect of the present disclosure provides a non-aqueous electrolyte solution for a lithium secondary battery in which high-temperature safety is improved by including an oligomer containing an acrylate-based cyanide (—CN) functional group and a compound capable of improving a film-forming effect together as an additive.

Another aspect of the present disclosure provides a lithium secondary battery including the non-aqueous electrolyte solution for a lithium secondary battery.

Technical Solution

According to an aspect of the present disclosure, there is provided a non-aqueous electrolyte solution for a lithium secondary battery which includes:
a lithium salt; a non-aqueous organic solvent; a first additive; and a second additive,
wherein the non-aqueous electrolyte solution for a lithium secondary battery includes an oligomer including a repeating unit derived from a monomer represented by the following Formula 1 and a repeating unit derived from a monomer represented by the following Formula 2 as the first additive, and
includes at least one selected from the group consisting of a nitrile-based compound, a lithium salt compound, and a cyclic carbonate compound as the second additive.

[Formula 1]

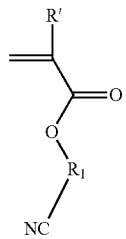

In Formula 1,

R' is hydrogen or an alkyl group having 1 to 3 carbon atoms, and $R_1$ is an alkylene group having 1 to 20 carbon atoms or $-(R_2)_oO(R_3)_p-$, wherein $R_2$ and $R_3$ are each independently an alkylene group having 1 to 20 carbon atoms, o is an integer of 1 to 3, and p is an integer of 0 to 3.

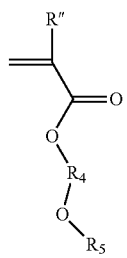

[Formula 2]

In Formula 2,

R" is hydrogen or an alkyl group having 1 to 3 carbon atoms, $R_4$ is an alkylene group having 1 to 10 carbon atoms, and $R_5$ is an alkyl group having 1 to 10 carbon atoms, an aryl group having 6 to 10 carbon atoms, a heteroaryl group having 3 to 10 carbon atoms, or a cycloalkyl group having 3 to carbon atoms.

According to another aspect of the present disclosure, there is provided a lithium secondary battery including:

a positive electrode including a positive electrode active material;

a negative electrode including a negative electrode active material;

a separator disposed between the negative electrode and the positive electrode; and the non-aqueous electrolyte solution for a secondary battery of the present disclosure.

Advantageous Effects

Since a non-aqueous electrolyte solution for a lithium secondary battery of the present disclosure includes an oligomer including a repeating unit having an acrylate-based cyanide functional group as a first additive, it may suppress a side reaction between a positive electrode and the electrolyte solution at high temperatures by forming a robust film on a surface of the positive electrode.

Also, since the non-aqueous electrolyte solution of the present disclosure includes a second additive capable of forming a stable film on a surface of a negative electrode together with the first additive, it may prevent a side reaction between a negative electrode and the electrolyte solution by forming a robust passivation film having improved stability and durability on a surface of the negative electrode and may achieve an effect of suppressing an increase in resistance.

If the non-aqueous electrolyte solution of the present disclosure is included, a lithium secondary battery having improved cycle characteristics and high-temperature stability may be achieved.

MODE FOR CARRYING OUT THE INVENTION

Hereinafter, the present disclosure will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Unless otherwise specified in the present disclosure, the expression "*" denotes a portion connected to a main chain of an oligomer or between ends of a formula.

The term 'substitution' in the present disclosure means that a hydrogen atom bonded to a carbon atom of a compound is replaced with another substituent, wherein a position to be substituted is not limited as long as it is a position where the hydrogen atom is substituted, that is, a position where the substituent may be substituted. In the above substitution, two or more substituents may be substituted, wherein the two or more substituents may be the same or different from each other. The substituent may include at least one selected from oxygen; at least one halogen group; a nitrile group; a nitro group; a hydroxyl group; an alkyl group having 1 to 5 carbon atoms; a cycloalkyl group; an aryl group; and a heterocyclic group, or may include a structure in which two or more substituents among the exemplified substituents are connected to each other. Specifically, the substituent may be at least one halogen group; a hydroxyl group; or an alkyl group having 1 to 5 carbon atoms.

Also, in this specification, when the terms "include," "comprise," "consist of", or "have" are used, other parts may be added unless 'only' is used. When a component is expressed as a singular number, the plural number is included unless otherwise specified.

In the present specification, the expression "%" denotes wt % unless explicitly stated otherwise.

Non-Aqueous Electrolyte Solution for Secondary Battery

A non-aqueous electrolyte solution for a secondary battery according to the present disclosure includes:

a lithium salt; a non-aqueous organic solvent; a first additive; and a second additive, wherein the non-aqueous electrolyte solution for a secondary battery may include an oligomer including a repeating unit derived from a monomer represented by the following Formula 1 and a repeating unit derived from a monomer represented by the following Formula 2 as the first additive, and may include at least one selected from the group consisting of a nitrile-based compound, a lithium salt compound, and a cyclic carbonate compound as the second additive.

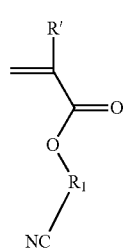

[Formula 1]

In Formula 1,

R' is hydrogen or an alkyl group having 1 to 3 carbon atoms, and $R_1$ is an alkylene group having 1 to 20 carbon atoms or —$(R_2)_oO(R_3)_p$—, wherein $R_2$ and $R_3$ are each independently an alkylene group having 1 to 20 carbon atoms, o is an integer of 1 to 3, and p is an integer of 0 to 3.

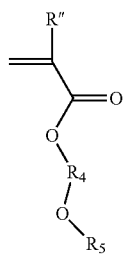

[Formula 2]

In Formula 2,

R'' is hydrogen or an alkyl group having 1 to 3 carbon atoms, $R_4$ is an alkylene group having 1 to 10 carbon atoms, and $R_5$ is an alkyl group having 1 to 10 carbon atoms, an aryl group having 6 to 10 carbon atoms, a heteroaryl group having 3 to 10 carbon atoms, or a cycloalkyl group having 3 to carbon atoms.

(A) Lithium Salt

First, the lithium salt will be described.

Any lithium salt typically used in an electrolyte solution for a lithium secondary battery may be used as the lithium salt without limitation, and, for example, the lithium salt may include Li$^+$ as a cation, and may include at least one selected from the group consisting of F$^-$, Cl$^-$, Br$^-$, I$^-$, NO$_3^-$, N(CN)$_2^-$, BF$_4^-$, ClO$_4^-$, B$_{10}$Cl$_{12}^-$, AlCl$_4^-$, AlO$_4^-$, PF$_6^-$, CF$_3$SO$_3^-$, CH$_3$CO$_2^-$, CF$_3$CO$_2^-$, AsF$_6^-$, SbF$_6^-$, CH$_3$SO$_3$, (CF$_3$CF$_2$SO$_2$)$_2$N$^-$, (CF$_3$SO$_2$)$_2$N$^-$, (FSO$_2$)$_2$N$^-$, BF$_2$C$_2$O$_4^-$, BC$_4$O$_8^-$, PF$_4$C$_2$O$_4^-$, PF$_2$C$_4$O$_8^-$, (CF$_3$)$_2$PF$_4^-$, (CF$_3$)$_3$PF$_3^-$, (CF$_3$)$_4$PF$_2$, (CF$_3$)$_5$PF$^-$, (CF$_3$)$_6$P$^-$, C$_4$F$_9$SO$_3^-$, CF$_3$CF$_2$SO$_3^-$, CF$_3$CF$_2$ (CF$_3$)$_2$CO$^-$, (CF$_3$SO$_2$)$_2$CH$^-$, CF$_3$(CF$_2$)$_7$SO$_3^-$, and SCN$^-$ as an anion.

Specifically, the lithium salt may include a single material selected from the group consisting of LiCl, LiBr, LiI, LiBF$_4$, LiClO$_4$, LiB$_{10}$Cl$_{10}$, LiAlCl$_4$, LiAlO$_4$, LiPF$_5$, LiCF$_3$SO$_3$, LiCH$_3$CO$_2$, LiCF$_3$CO$_2$, LiAsF$_6$, LiSbF$_6$, LiCH$_3$SO$_3$, LiN(SO$_2$F)$_2$ (lithium bis(fluorosulfonyl)imide, LiFSI), LiN(SO$_2$CF$_2$CF$_3$)$_2$ (lithium bis(perfluoroethanesulfonyl)imide, LiBETI), and LiN(SO$_2$CF$_3$)$_2$ (lithium bis(trifluoromethanesulfonyl)imide, LiTFSI) or a mixture of two or more thereof, and may particularly include at least one selected from LiPF$_5$, LiFSI, and LiTFSI which have high ionic conductivity.

The lithium salt may be appropriately changed in a normally usable range, but may be included in a concentration of 0.8 M to 4.0 M, for example, 1.0 M to 3.0 M in the electrolyte solution to obtain an optimum effect of forming a film for preventing corrosion of a surface of an electrode.

In a case in which the concentration of the lithium salt is within the above range, viscosity of the non-aqueous electrolyte solution may be controlled so that optimum impregnability may be achieved, and an effect of improving capacity characteristics and cycle characteristics of the lithium secondary battery may be obtained by improving mobility of lithium ions.

(B) Non-Aqueous Organic Solvent

Also, the non-aqueous organic solvent will be described as follows.

Various organic solvents typically used in a non-aqueous electrolyte solution may be used as the non-aqueous organic solvent without limitation, wherein a type of the non-aqueous organic solvent is not limited as long as the non-aqueous organic solvent may minimize decomposition due to an oxidation reaction during charge and discharge of the secondary battery and may exhibit desired characteristics with the additive.

Specifically, the non-aqueous organic solvent may include (i) a cyclic carbonate-based organic solvent, (ii) a linear carbonate-based organic solvent, (iii) a linear ester-based organic solvent, or a mixed organic solvent thereof.

The (i) cyclic carbonate-based organic solvent is a highly viscous organic solvent which well dissociates the lithium salt in the non-aqueous electrolyte solution due to high permittivity, wherein specific examples thereof may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate-based organic solvent may include at least one of ethylene carbonate and propylene carbonate.

The (ii) linear carbonate-based organic solvent is an organic solvent having low viscosity and low permittivity, wherein specific examples of the linear carbonate-based organic solvent may be at least one selected from the group consisting of dimethyl carbonate (DMC), diethyl carbonate (DEC), dipropyl carbonate, ethyl methyl carbonate (EMC), methylpropyl carbonate, and ethylpropyl carbonate, and the linear carbonate-based organic solvent may specifically include dimethyl carbonate and ethyl methyl carbonate.

The (iii) linear ester-based organic solvent is a solvent having relatively higher stability during high-temperature and high-voltage operation than the cyclic carbonate-based organic solvent, wherein it may improve disadvantages of the cyclic carbonate-based organic solvent causing gas generation during high-temperature operation and may achieve high ionic conductivity at the same time.

As a representative example, the (iii) linear ester-based organic solvent may include at least one organic solvent selected from the group consisting of methyl acetate, ethyl acetate, propyl acetate, methyl propionate, ethyl propionate, propyl propionate, and butyl propionate, and may specifically include at least one of ethyl propionate and propyl propionate.

Also, in order to prepare an electrolyte solution having high ionic conductivity in the present disclosure, the non-aqueous organic solvent may further include (iv) a cyclic ester-based organic solvent, if necessary.

The (iv) cyclic ester-based organic solvent may include at least one selected from the group consisting of γ-butyrolactone, γ-valerolactone, γ-caprolactone, σ-valerolactone, and ε-caprolactone.

A remainder excluding the lithium salt and the first and second additives in the non-aqueous electrolyte solution of the present disclosure may all be the non-aqueous organic solvent unless otherwise stated.

(C) First Additive

The non-aqueous electrolyte solution for a lithium secondary battery of the present disclosure may include an oligomer containing an acrylate-based cyanide (—CN) functional group as a first additive.

Specifically, the oligomer may include a repeating unit derived from a monomer represented by the following Formula 1 and a repeating unit derived from a monomer represented by the following Formula 2.

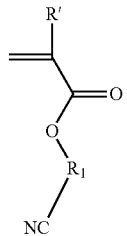

[Formula 1]

In Formula 1,

R' is hydrogen or an alkyl group having 1 to 3 carbon atoms, and $R_1$ is an alkylene group having 1 to 20 carbon atoms or $-(R_2)_oO(R_3)_p-$, wherein $R_2$ and $R_3$ are each independently an alkylene group having 1 to 20 carbon atoms, o is an integer of 1 to 3, and p is an integer of 0 to 3.

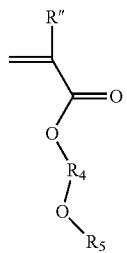

[Formula 2]

In Formula 2,

R" is hydrogen or an alkyl group having 1 to 3 carbon atoms, $R_4$ is an alkylene group having 1 to 10 carbon atoms, and $R_5$ is an alkyl group having 1 to 10 carbon atoms, an aryl group having 6 to 10 carbon atoms, a heteroaryl group having 3 to 10 carbon atoms, or a cycloalkyl group having 3 to carbon atoms.

Specifically, since the oligomer of the present disclosure includes a repeating unit containing an acrylate main chain and a cyanide group (—CN, nitrile group) having a strong binding force with metal ions as a terminal functional group, it may form a stable film by forming a strong bond with the surface of the electrode, particularly, a surface of a positive electrode. Also, since the cyanide group has a high tendency to adsorb metal ions that are dissolved from the positive electrode by a charging and discharging process of the secondary battery or a chemical dissolution reaction of the electrolyte solution, an effect of inhibiting the dissolution of the metal ions from the positive electrode, that is, an effect of inhibiting generation of metal ions in the battery is excellent. Thus, high-temperature durability, high-temperature storage characteristics, and high-temperature stability of the secondary battery may be improved.

The oligomer included as the first additive in the present disclosure may include an oligomer represented by Formula 3 below.

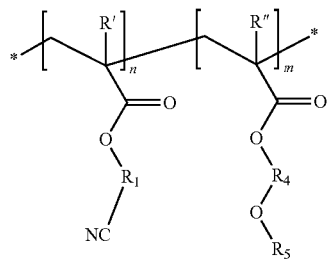

[Formula 3]

In Formula 3,

R' and R" are each independently hydrogen or an alkyl group having 1 to 3 carbon atoms, $R_1$ is an alkylene group having 1 to 10 carbon atoms or $-(R_2)_oO(R_3)_p-$, wherein $R_2$ and $R_3$ are each independently an alkylene group having 1 to 10 carbon atoms, o is an integer of 1 to 3, and p is an integer of 0 to 3, $R_4$ is an alkylene group having 1 to 10 carbon atoms, $R_5$ is an alkyl group having 1 to 10 carbon atoms, an aryl group having 6 to 10 carbon atoms, a heteroaryl group having 3 to 10 carbon atoms, or a cycloalkyl group having 3 to carbon atoms, and a molar ratio of n:m is in a range of 1:99 to 99:1.

In the oligomer of the present disclosure, the expression "*" denotes a portion connected to a main chain of the oligomer or between ends of the formula, wherein both terminal groups of the oligomer may be the same or different from each other. Specifically, the ends of the oligomer may each independently be an alkyl group, an alkoxy group, a hydroxyl group, an aldehyde group, an ester group, a halogen group, a halide group, a vinyl group, a (meth)acrylate group, a carboxyl group, a phenyl group, an amine group, an amide group, or a sulfonyl group, and specifically, the terminal group may be an alkyl group having 1 to 5 carbon atoms.

Specifically, in Formula 3, R' and R" may each independently be hydrogen or an alkyl group having 1 or 2 carbon atoms, $R_1$ may be an alkylene group having 1 to 6 carbon atoms or $-(R_2)_oO(R_3)_p-$, wherein $R_2$ and $R_3$ may each independently be an alkylene group having 1 to 6 carbon atoms, o may be an integer of 1 to 3, and p may be an integer of 0 to 3, $R_4$ may be an alkylene group having 1 to 6 carbon atoms, $R_5$ may be an alkyl group having 1 to 6 carbon atoms, an aryl group having 6 to 8 carbon atoms, a heteroaryl group having 3 to 8 carbon atoms, or a cycloalkyl group having 3 to 8 carbon atoms, and the molar ratio of n:m may be in a range of 20:80 to 90:10.

Also, in Formula 3, R' and R" may each independently be hydrogen or an alkyl group having 1 or 2 carbon atoms, $R_1$ may be an alkylene group having 1 to 6 carbon atoms or $-(R_2)_oO(R_3)_p-$, wherein $R_2$ and $R_3$ may each independently be an alkylene group having 1 to 6 carbon atoms, o may be an integer of 1 to 3, and p may be an integer of 0 to 3, $R_4$ may be an alkylene group having 1 to 6 carbon atoms, $R_5$ may be an aryl group having 6 to 8 carbon atoms, a heteroaryl group having 3 to 8 carbon atoms, or a cycloalkyl group having 3 to 8 carbon atoms, and the molar ratio of n:m may be in a range of 30:70 to 90:10.

More specifically, the oligomer represented by Formula 3 may include at least one selected from the group consisting of oligomers represented by Formulae 3A to 3F below.

[Formula 3A]

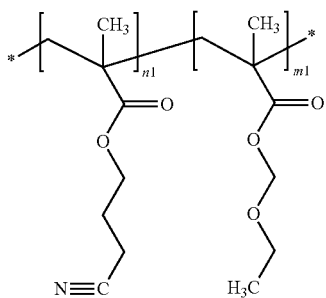

In Formula 3A,
a molar ratio of n1:m1 is in a range of 1:99 to 99:1.

[Formula 3B]

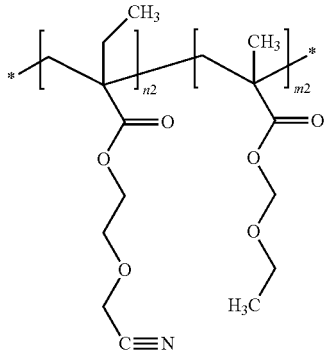

In Formula 3B,
a molar ratio of n2:m2 is in a range of 1:99 to 99:1.

[Formula 3C]

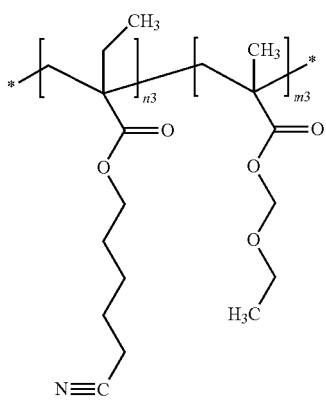

In Formula 3C,
a molar ratio of n3:m3 is in a range of 1:99 to 99:1.

[Formula 3D]

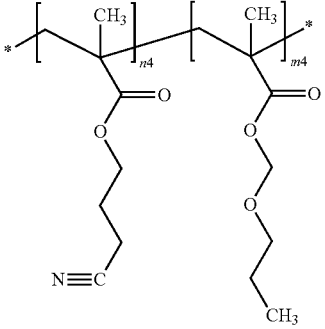

In Formula 3D,
a molar ratio of n4:m4 is in a range of 1:99 to 99:1.

[Formula 3E]

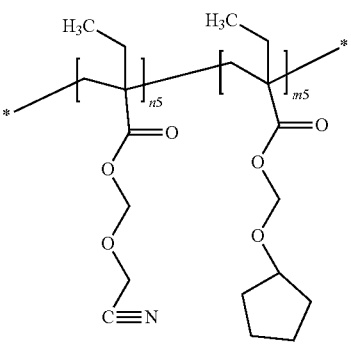

In Formula 3E,
a molar ratio of n5:m5 is in a range of 1:99 to 99:1.

[Formula 3F]

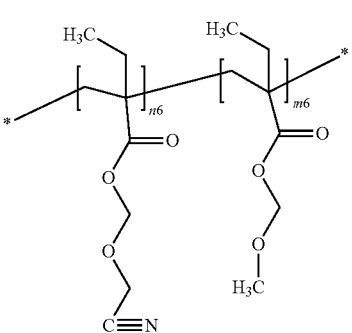

In Formula 3F,
a molar ratio of n6:m6 is in a range of 1:99 to 99:1.

A weight-average molecular weight (Mw) of the oligomer of the present disclosure may be controlled by the number of repeating units, and may be in a range of about 1,000 g/mol to about 1,500,000 g/mol, particularly 2,000 g/mol to 1,200,000 g/mol, and more particularly 5,000 g/mol to 500,000 g/mol. In a case in which the weight-average molecular weight of the oligomer is within the above range, a uniform non-aqueous electrolyte solution with high ionic conductivity may be prepared by ensuring affinity with the non-aqueous electrolyte solution solvent.

The weight-average molecular weight may be measured using a gel permeation chromatography (GPC) apparatus, and, unless otherwise specified, a molecular weight may denote the weight-average molecular weight. For example, in the present disclosure, the weight-average molecular weight is measured using 1200 series by Agilent Technologies under GPC conditions, a PL mixed B column by Agilent Technologies may be used in this case, and tetrahydrofuran (THF) may be used as a solvent.

Also, the oligomer of the present disclosure may be present in an amount of 0.1 wt % to 5.0 wt % based on a total weight of the non-aqueous electrolyte solution for a lithium secondary battery.

If the oligomer is present in an amount within the above range, an effect of improving stability and high-temperature performance may be obtained. Specifically, in a case in which the amount of the oligomer is 0.1 wt % or more, an effect of forming a stable film and exhibiting flame retardant properties may be achieved, and, in a case in which the amount of the oligomer is 5.0 wt % or less, a decrease in ionic conductivity of the non-aqueous electrolyte solution for a lithium secondary battery may be prevented, and formation of a non-uniform film on the surface or an increase in side reaction may be prevented. Furthermore, since a decrease in moisture-retention property may be prevented by suppressing an increase in the viscosity of the non-aqueous electrolyte solution for a lithium secondary battery, a decrease in capacity characteristics may be improved.

Specifically, the oligomer of the present disclosure may be present in an amount of 0.1 wt % to 3.0 wt % based on the total weight of the non-aqueous electrolyte solution for a lithium secondary battery.

(D) Second Additive

The non-aqueous electrolyte solution for a lithium secondary battery of the present disclosure may further include a second additive so as to obtain a synergistic effect of improving an effect of forming a film on the surface of the electrode by being mixed with the oligomer included as the first additive.

The second additive may include at least one selected from the group consisting of a nitrile-based compound, a lithium salt compound, and a cyclic carbonate compound.

(D-1) Nitrile-Based Compound

The non-aqueous electrolyte solution for a lithium secondary battery of the present disclosure may include a nitrile-based compound as the second additive.

Since the nitrile-based compound may improve safety of the non-aqueous electrolyte solution due to low volatility of the solvent, for example, its presence in a solid form at room temperature and may form a uniform and robust film on the positive electrode and negative electrode during battery operation to reduce a reaction between the electrode and the non-aqueous electrolyte solution, durability and high-rate charge/discharge characteristics of the battery may be improved.

The nitrile-based compound may include a compound including at least one cyanide group (—CN, nitrile group) as a terminal functional group, may specifically include at least one selected from succinonitrile (SN), adiponitrile (1,4-dicyanobutane or 1,6-hexanedinitrile), dicyanobutene (DCB), ethylene glycol bis(propionitrile)ether, hexanetricarbonitrile (HTCN), acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile, and may more specifically include at least one selected from the group consisting of succinonitrile, adiponitrile, dicyanobutene, ethylene glycol bis(propionitrile)ether, and hexanetricarbonitrile (HTCN) which may act as a complementary agent capable of forming a more stable solid electrolyte interphase (SEI) on a surface of the negative electrode.

The nitrile-based compound may be present in a weight ratio of 0.01 to 100 based on the by weight of the oligomer as the first additive.

If the nitrile-based compound is included within the above amount range, since a stable and robust SEI may be formed on the surface of the negative electrode and formation of a non-uniform film due to excessive use of the additive or occurrence of a side reaction and an increase in resistance due to a negative electrode reduction reaction may be suppressed, the effect of improving high-temperature performance and stability may be exhibited.

Specifically, a weight ratio of the oligomer, as the first additive, to the nitrile-based compound may be in a range of 1:0.05 to 1:50, for example, 1:0.1 to 1:30.

(D-2) Lithium Salt Compound

The non-aqueous electrolyte solution for a lithium secondary battery of the present disclosure may include a lithium salt compound as the second additive.

The lithium salt compound is a compound different from the lithium salt included in the non-aqueous electrolyte solution, wherein it may include a compound having a form of a lithium salt which may suppress decomposition of the solvent in the non-aqueous electrolyte solution by reducing a side reaction between the electrode and the non-aqueous electrolyte solution by forming a uniform and robust film on the positive electrode and the negative electrode during battery operation. The mobility of the lithium ions may be improved, the durability of the battery may be simultaneously improved, and the high-rate charge/discharge characteristics of the battery may be improved by including the lithium salt compound.

The lithium salt compound may be divided into (i) phosphate-based lithium and (ii) boron-based lithium.

The (i) phosphate-based lithium may include lithium difluorophosphate (LiDFP) or lithium difluoro bis(oxalato) phosphate (LiDFOP).

Also, the (ii) boron-based lithium may be divided into (ii-1) boron halide-based lithium and (ii-2) boron oxalate-based lithium.

The (ii-1) boron halide-based lithium may include lithium tetrafluoroborate (LiBF$_4$) or lithium tetrachloroborate (LiBCl$_4$), and may specifically be lithium tetrafluoroborate (LiBF$_4$).

As the (ii-2) boron oxalate-based lithium, lithium bis(oxalato)borate (LiBOB), lithium difluoro(oxalato)borate (LiODFB), or lithium dichloro(oxalato)borate (LiODCB) may be used, and the (ii-2) boron oxalate-based lithium may be lithium bis(oxalato)borate (LiBOB) or lithium difluoro(oxalato)borate (LiODFB) particularly in consideration of optimization of high-temperature storage characteristics and life characteristics.

Specifically, the lithium salt compound may include at least one selected from lithium difluorophosphate (LiDFP), lithium difluorobis(oxalato)phosphate (LiDFOP), LiBF$_4$, lithium bis(oxalato)borate (LiBOB), and lithium difluoro (oxalato)borate (LiODFB), and may more specifically include at least one of lithium bis(oxalato)borate (LiBOB) and lithium difluoro(oxalato)borate (LiODFB).

Since the non-aqueous electrolyte solution for a secondary battery of the present disclosure stabilizes the SEI of the positive electrode and the negative electrode by using the lithium salt compound capable of helping the formation of the negative electrode film together with the oligomer, overall performance, such as high-rate charge/discharge characteristics, high-temperature storage characteristics, and life characteristics, of the lithium secondary battery may be improved.

In a case in which the lithium salt compound is included as the second additive, the lithium salt compound may be present in a weight ratio of 0.01:100 to 1:100 based on the by weight of the oligomer as the first additive.

If the lithium salt compound is included within the above amount range, a radical produced as a by-product is further reacted with other cyclic carbonates while a ring (bond) is broken through an oxidation reaction, a polymerization reaction proceeds during this process, and a stable film may be formed on the surface of the positive electrode while reacting to this mechanism.

Specifically, in order to prevent a side reaction caused by the lithium salt compound remaining after the film formation, the lithium salt compound may be present in a weight ratio of 100 or less, for example, 70 or less. If the weight ratio of the lithium salt compound is greater than 100, since the radical generated during a reduction process causes a side reaction of the copolymer electrolyte solution, performance degradation may occur. Also, the product of the side reaction may be accumulated on the electrode film to increase resistance in the cell or cause degradation of high-rate, high-temperature durability and cycle characteristics due to decomposition of the electrolyte solution and additive.

Furthermore, the lithium salt compound may be present in a weight ratio of 0.01 or more in order to secure the amount of the radical. If the lithium salt compound is present in a weight ratio of less than 0.01, the amount of the radical generated during the formation of the film by the lithium salt compound is absolutely insufficient, and, accordingly, a chain reaction for the film formation is reduced to generate defects on a surface of the film, the performance degradation is affected.

Specifically, the oligomer, as the first additive, and the lithium salt compound may be present in a weight ratio of 1:0.1 to 1:70.

(D-3) Cyclic Carbonate-Based Compound

The non-aqueous electrolyte solution for a lithium secondary battery of the present disclosure may include a cyclic carbonate-based compound, which is different from the non-aqueous organic solvent, as the second additive.

The cyclic carbonate-based compound is an additive that may help in the film formation together with the oligomer, wherein, since it may form a stable film by a double bond contained in a cyclic structure while being reduced on the surface of the negative electrode, it is effective in suppressing the gas generation and the side reaction with the electrolyte solution caused during the formation of the negative electrode film. The film formed by the cyclic carbonate-based compound may affect the improvement of lifetime and high-temperature durability.

As a representative example, the cyclic carbonate-based compound may include at least one selected from the group consisting of vinylene carbonate (VC), vinylethylene carbonate (VEC), and fluoroethylene carbonate (FEC), and may more specifically include both vinylethylene carbonate (VEC) and fluoroethylene carbonate (FEC).

Since the fluoroethylene carbonate may form a thinner negative electrode film than other fluorine-substituted or unsubstituted cyclic carbonate-based compounds, it may reduce the resistance in the cell, and, accordingly, it is more effective in improving performance. Also, since the fluoroethylene carbonate may inhibit a reduction reaction of ethylene carbonate that is used as the non-aqueous organic solvent, it may also help to improve cycle characteristics. Thus, a uniform and robust film formed thereby may further improve the durability and high-rate charge/discharge characteristics of the battery by reducing a reaction between the electrode and the non-aqueous organic solvent.

In a case in which the cyclic carbonate-based compound is included as the second additive, the cyclic carbonate-based compound may be present in a weight ratio of 0.001 to 150 based on the by weight of the oligomer as the first additive.

If the cyclic carbonate-based compound is included within the above amount ratio, since a stable and robust SEI may be formed on the surface of the negative electrode and the formation of the non-uniform film due to the excessive use of the additive or the occurrence of the side reaction and the increase in resistance due to the negative electrode reduction reaction may be suppressed, the effect of improving the high-temperature performance and stability may be exhibited. That is, when the weight ratio of the cyclic carbonate-based compound is 0.001 or more, a stable film may be formed on the surface of the negative electrode, and the effect of improving high-temperature lifetime and safety may be exhibited. Also, when the weight ratio of the cyclic carbonate-based compound is 150 or less, problems, such as the formation of the non-uniform film due to the excessive use and the occurrence of the side reaction and the increase in resistance due to the negative electrode reduction reaction, are not caused, and high-temperature performance and safety may be improved.

Specifically, a weight ratio of the oligomer, as the first additive, to the cyclic carbonate-based compound may be in a range of 1:0.05 to 1:50, for example, 1:0.1 to 1:30.

The second additive may be used in an amount of less than 11 wt % based on the total weight of the non-aqueous electrolyte solution, and may be used by appropriately adjusting a relative weight ratio of the second additive to the first oligomer according to each type of the second additive.

Thus, since the non-aqueous electrolyte solution for a lithium secondary battery of the present disclosure may form a more stable SEI on the surfaces of the positive electrode and the negative electrode by using the second additive capable of helping the formation of the film together with the oligomer containing the acrylate-based cyanide terminal functional group, the overall performance, such as high-rate charge/discharge characteristics, high-temperature storage characteristics, and life characteristics, of the lithium secondary battery may be improved.

(E) Third Additive

Also, the non-aqueous electrolyte solution for a lithium secondary battery of the present disclosure may further include a third additive, if necessary, in order to prevent the occurrence of collapse of the negative electrode due to the decomposition of the non-aqueous electrolyte solution in a high power environment or to further improve low-temperature high rate discharge characteristics, high-temperature stability, overcharge prevention, and an effect of suppressing battery swelling at high temperature.

Examples of the third additive may be at least one selected from the group consisting of a sultone-based compound, a sulfate-based compound, a phosphate-based or phosphite-based compound, a benzene-based compound, an amine-based compound, and a silane-based compound.

The sultone-based compound, for example, may be at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The sulfate-based compound, for example, may be ethylene sulfate (Esa), trimethylene sulfate (TMS), or methyl trimethylene sulfate (MTMS).

The phosphate-based or phosphite-based compound, for example, may be at least one compound selected from the group consisting of lithium difluoro(bisoxalato)phosphate, lithium difluorophosphate, tris(trimethylsilyl)phosphate, tris(trimethylsilyl)phosphite, tris(2,2,2-trifluoroethyl)phosphate, and tris(trifluoroethyl)phosphite.

The benzene-based compound may be fluorobenzene, the amine-based compound may be triethanolamine or ethylene diamine, and the silane-based compound may be tetravinylsilane.

Two or more compounds may be mixed and used as the third additive, and the third additive may be present in an amount of 10 wt % or less based on the total weight of the non-aqueous electrolyte solution in order to prevent the side reaction due to the excessive amount of the additive.

Lithium Secondary Battery

Next, a lithium secondary battery according to the present disclosure will be described.

The lithium secondary battery according to the present disclosure includes:

a positive electrode including a positive electrode active material;

a negative electrode including a negative electrode active material;

a separator disposed between the negative electrode and the positive electrode; and the above-described non-aqueous electrolyte solution for a lithium secondary battery of the present disclosure.

The lithium secondary battery of the present disclosure may be prepared by forming an electrode assembly, in which a positive electrode, a negative electrode, and a separator disposed between the positive electrode and the negative electrode are sequentially stacked, accommodating the electrode assembly in a battery case, and then injecting the non-aqueous electrolyte solution of the present disclosure.

A typical method known in the art may be used as a method of preparing the lithium secondary battery of the present disclosure, and the method of preparing the lithium secondary battery of the present disclosure is specifically as described below.

(1) Positive Electrode

The positive electrode according to the present disclosure may include a positive electrode active material layer including a positive electrode active material, and, if necessary, the positive electrode active material layer may further include a conductive agent and/or a binder.

The positive electrode active material is a compound capable of reversibly intercalating and deintercalating lithium, wherein the positive electrode active material may specifically include a lithium composite metal oxide including lithium and at least one metal selected from the group consisting of nickel (Ni), cobalt (Co), manganese (Mn), iron (Fe), and aluminum (Al), and may particularly include a high-nickel (Ni) lithium composite metal oxide in which a Ni content is high at 0.55 or more.

Specifically, typical examples of the positive electrode active material may be $Li(Ni_{0.6}Mn_{0.2}Co_{2.2})O_2$, $Li(Ni_{0.7}Mn_{0.20}Co_{0.10})O_2$, $Li(Ni_{0.8}Mn_{0.1}Co_{0.1})O_2$, $Li[Ni_{0.8}Co_{0.15}Al_{0.05}]O_2$, $Li[Ni_{0.86}Mn_{0.07}Co_{0.05}Al_{0.02}]O_2$, or $Li(Ni_{0.9}Mn_{0.05}Co_{0.05})O_2$.

With respect to the lithium composite metal oxide having a high Ni content, despite the advantage of being able to achieve a high-capacity battery, there has been a problem in that $Ni^{2+}$ cations are dissolved from the positive electrode into the non-aqueous electrolyte solution, the $Ni^{2+}$ cations react with a passivation film (SEI) of the negative electrode to decompose the SEI, and, as a result, since a portion of the negative electrode active material is exposed to the non-aqueous electrolyte solution to cause a side reaction, capacity and life characteristics are degraded and resistance is increased. Thus, with respect to the lithium composite metal oxide having a high Ni content, despite the advantage of being able to achieve a high-capacity battery, the life characteristics of the battery may be degraded and the resistance may be increased. Also, with respect to the high-Ni positive electrode active material, the dissolution of the transition metal may be intensified by acceleration of structural collapse of the positive electrode due to high-temperature exposure, and may be accelerated particularly when HF is present in the non-aqueous electrolyte solution.

Thus, in order to solve this problem, the lithium secondary battery of the present disclosure may suppress the side reaction of the electrolyte solution by forming a robust film on the surface of the electrode by including the lithium salt compound together with the oligomer containing an acrylate-based cyanide terminal functional group as a component of the non-aqueous electrolyte solution for a lithium secondary battery, and, furthermore, degradation of high-temperature durability, high-temperature capacity, and life characteristics of the lithium secondary battery may be prevented.

Also, in addition to the above-described lithium composite metal oxide, the positive electrode active material may further include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$)), lithium-nickel-cobalt-based oxide (e.g., $LiNi_{1-Y1}Co_{Y1}O_2$ (where $0<Y1<1$)), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$)), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), or lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), if necessary.

The positive electrode active material may be included in an amount of 80 wt % to 98 wt %, for example, 85 wt % to 98 wt % based on a total weight of the positive electrode active material layer. When the positive electrode active material is included in an amount within the above range, excellent capacity characteristics may be exhibited.

Also, the conductive agent is not particularly limited as long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The conductive agent may be commonly added in an amount of 1 wt % to 30 wt % based on a total weight of a solid content in the positive electrode active material layer.

Furthermore, the binder is a component that improves the adhesion between positive electrode active material particles and the adhesion between the positive electrode active material and a current collector, wherein the binder is commonly added in an amount of 1 wt % to 30 wt % based on the total weight of the solid content in the positive electrode active material layer. Examples of the binder may be a fluorine resin-based binder including polyvinylidene fluoride (PVDF) or polytetrafluoroethylene (PTFE); a rubber-based binder including a styrene butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; and a silane-based binder.

The positive electrode of the present disclosure as described above may be prepared by a method of preparing a positive electrode which is known in the art. For example, the positive electrode may be prepared by a method in which a positive electrode collector is coated with a positive electrode slurry, which is prepared by dissolving or dispersing the positive electrode active material, the binder, and/or the conductive agent in a solvent, dried, and then rolled to form a positive electrode active material layer, or a method in which the positive electrode active material layer is cast on a separate support and a film separated from the support is then laminated on the positive electrode collector.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The solvent may include an organic solvent, such as N-methyl-2-pyrrolidone (NMP), and may be used in an amount such that desirable viscosity is obtained when the positive electrode active material as well as optionally the binder and the conductive agent are included. For example, the solvent may be included in an amount such that a concentration of the solid content in the active material slurry including the positive electrode active material as well as optionally the binder and the conductive agent is in a range of 10 wt % to 90 wt %, for example, 30 wt % to 80 wt %.

(2) Negative Electrode

Next, the negative electrode will be described.

The negative electrode according to the present disclosure includes a negative electrode active material layer including a negative electrode active material, and the negative electrode active material layer may further include a conductive agent and/or a binder, if necessary. Also, the negative electrode according to the present disclosure may use a lithium metal electrode or a metal electrode such as copper (Cu) or Ni.

Various negative electrode active materials used in the art, for example, a carbon-based negative electrode active material capable of reversibly intercalating/deintercalating lithium ions, a silicon-based negative electrode active material which may be doped and undoped with lithium, or a mixture thereof may be included as the negative electrode active material.

As the carbon-based negative electrode active material, various carbon-based negative electrode active materials used in the art, for example, a graphite-based materials such as natural graphite, artificial graphite, and Kish graphite; pyrolytic carbon, mesophase pitch based carbon fiber, mesocarbon microbeads, mesophase pitches, high-temperature sintered carbon such as petroleum or coal tar pitch derived cokes, soft carbon, and hard carbon may be used. A shape of the carbon-based negative electrode active material is not particularly limited, and materials of various shapes, such as an irregular shape, planar shape, flaky shape, spherical shape, or fibrous shape, may be used.

Preferably, the carbon-based negative electrode active material may include at least one of natural graphite and artificial graphite. More preferably, the carbon-based negative electrode active material may include natural graphite and artificial graphite. In a case in which the natural graphite and the artificial graphite are used together, adhesion with the current collector may be increased to suppress exfoliation of the active material.

According to another embodiment, the negative electrode active material may use a silicon-based negative electrode active material together with the carbon-based negative electrode active material.

The silicon-based negative electrode active material, for example, may include at least one selected from the group consisting of metallic silicon (Si), silicon oxide ($SiO_x$, where $0<x<2$), silicon carbide (SiC), and a Si—Y alloy (where Y is an element selected from the group consisting of alkali metal, alkaline earth metal, a Group 13 element, a Group 14 element, transition metal, a rare earth element, and a combination thereof, and is not Si). The element Y may be selected from the group consisting of Mg, calcium (Ca), strontium (Sr), barium (Ba), radium (Ra), scandium (Sc), yttrium (Y), Ti, zirconium (Zr), hafnium (Hf), rutherfordium (Rf), V, niobium (Nb), Ta, dubnium (db), Cr, Mo, tungsten (W), seaborgium (Sg), technetium (Tc), rhenium (Re), bohrium (Bh), Fe, lead (Pb), ruthenium (Ru), osmium (Os), hassium (Hs), rhodium (Rh), iridium (Ir), palladium (Pd), platinum (Pt), Cu, silver (Ag), gold (Au), zinc (Zn), cadmium (Cd), boron (B), Al, gallium (Ga), tin (Sn), indium (In), germanium (Ge), phosphorus (P), arsenic (As), antimony (Sb), bismuth (Bi), sulfur (S), selenium (Se), tellurium (Te), polonium (Po), and a combination thereof.

Since the silicon-based negative electrode active material has higher capacity characteristics than the carbon-based negative electrode active material, better capacity characteristics may be obtained when the silicon-based negative electrode active material is further included.

A mixing ratio of the silicon-based negative electrode active material:the carbon-based negative electrode active material may be in a range of 3:97 to 99:1, for example, 5:95 to 15:85, as a weight ratio. In a case in which the mixing ratio of the silicon-based negative electrode active material to the carbon-based negative electrode active material satisfies the above range, since a volume expansion of the silicon-based negative electrode active material is suppressed while capacity characteristics are improved, excellent cycle performance may be secured.

The negative electrode active material may be included in an amount of 80 wt % to 99 wt % based on a total weight of the negative electrode active material layer. In a case in which the amount of the negative electrode active material satisfies the above range, excellent capacity characteristics and electrochemical properties may be obtained.

Next, the conductive agent is a component for further improving conductivity of the negative electrode active material, wherein the conductive agent may be added in an amount of 1 wt % to 20 wt % based on a total weight of a solid content in the negative electrode active material layer. Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, or thermal black; conductive fibers such as carbon fibers or metal fibers; conductive powder such as fluorocarbon powder, aluminum powder, or nickel powder; conductive whiskers such as zinc oxide whiskers and potassium titanate whiskers; conductive metal oxide such as titanium oxide; or polyphenylene derivatives, may be used as the conductive agent.

The binder is a component that assists in the binding between the conductive agent, the active material, and the current collector, wherein the binder is commonly added in an amount of 1 wt % to 30 wt % based on the total weight of the solid content in the negative electrode active material layer. Examples of the binder may be a fluorine resin-based binder including polyvinylidene fluoride (PVDF) or polytetrafluoroethylene (PTFE); a rubber-based binder including a styrene butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; and a silane-based binder.

The negative electrode may be prepared by a method of preparing a negative electrode which is known in the art. For example, the negative electrode may be prepared by a method in which a negative electrode collector is coated with a negative electrode active material slurry, which is prepared by dissolving or dispersing the negative electrode active material as well as optionally the binder and the conductive agent in a solvent, rolled and dried to form a negative electrode active material layer, or may be prepared by casting the negative electrode active material layer on a separate support and then laminating a film separated from the support on the negative electrode collector.

The negative electrode collector generally has a thickness of 3 μm to 500 μm. The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, or an aluminum-cadmium alloy may be used. Also, similar to the positive electrode collector, microscopic irregularities may be formed on the surface of the collector to improve the adhesion of the negative electrode active material, and the negative electrode collector, for example, may be used in various shapes such as that of a film, a sheet, a foil, a net, a porous body, a foam body, a non-woven fabric body, and the like.

The solvent may include water or an organic solvent, such as NMP and alcohol, and may be used in an amount such that desirable viscosity is obtained when the negative electrode active material as well as optionally the binder and the conductive agent are included. For example, the solvent may be included in an amount such that a concentration of the solid content in the active material slurry including the negative electrode active material as well as optionally the binder and the conductive agent is in a range of 50 wt % to 75 wt %, for example, 40 wt % to 70 wt %.

(3) Separator

The lithium secondary battery according to the present disclosure includes a separator between the positive electrode and the negative electrode.

The separator separates the negative electrode and the positive electrode and provides a movement path of lithium ions, wherein any separator may be used without particular limitation as long as it is typically used as a separator in a lithium secondary battery, and particularly, a separator having high moisture-retention ability for an electrolyte solution as well as low resistance to the transfer of ions of the non-aqueous electrolyte solution may be used.

Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be optionally used.

The lithium secondary battery according to the present disclosure as described above may be suitably used in portable devices, such as mobile phones, notebook computers, and digital cameras, and electric cars such as a hybrid electric vehicle (HEV).

Thus, according to another embodiment of the present disclosure, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle (HEV), and a plug-in hybrid electric vehicle (PHEV); or a power storage system.

A shape of the lithium secondary battery of the present disclosure is not particularly limited, but a cylindrical type using a can, a prismatic type, a pouch type, or a coin type may be used.

The lithium secondary battery according to the present disclosure may not only be used in a battery cell that is used as a power source of a small device, but may also be used as a unit cell in a medium and large sized battery module including a plurality of battery cells.

Hereinafter, the present disclosure will be described in more detail according to examples. However, the invention may be embodied in many different forms and should not be construed as being limited to the embodiments set forth herein. Rather, these example embodiments are provided so that this description will be thorough and complete, and will fully convey the scope of the present disclosure to those skilled in the art.

EXAMPLES

I. Examples

Example 1-1

(Preparation of Non-Aqueous Electrolyte Solution for Lithium Secondary Battery)

After $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution for a secondary battery was prepared by adding 0.1 wt % of the oligomer (weight-average molecular weight (Mw)=12,000, molar ratio of n1:m1 was 80:20) represented by Formula 3A as a first additive and 0.05 wt % of LiODFB and 0.05 wt % of LiBOB as a second additive (see Table 1 below).

(Lithium Secondary Battery Preparation)

A positive electrode active material ($LiCoO_2$), carbon black as a conductive agent, and polyvinylidene fluoride, as a binder, were added in a weight ratio of 98:1:1 to N-methyl-2-pyrrolidone (NMP), as a solvent, to prepare a positive electrode slurry (solid content 40 wt %). A 20 μm thick positive electrode collector (Al thin film) was coated with the positive electrode slurry, dried, and then roll-pressed to prepare a positive electrode.

A negative electrode active material (graphite), carbon black as a conductive agent, SBR as a binder, and CMC, as a thickener, were added in a weight ratio of 95.6:1:2.3:1.1 to NMP to prepare a negative electrode slurry (solid content: 90 wt %). A 10 μm thick copper (Cu) thin film, as a negative electrode collector, was coated with the negative electrode slurry, dried, and then roll-pressed to prepare a negative electrode.

After an electrode assembly was prepared by sequentially stacking the above-prepared positive electrode, a separator formed of a polyethylene porous film, and the negative electrode, the electrode assembly was accommodated in a pouch-type battery case, and 5 ml of the above-prepared non-aqueous electrolyte solution for a secondary battery was injected thereinto to prepare a pouch-type lithium secondary battery.

Example 1-2

A lithium secondary battery was prepared in the same manner as in Example 1-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution for a secondary battery was prepared by adding 0.1 wt % of the oligomer (weight-average molecular weight (Mw)=12,000, molar ratio of n1:m1 was 80:20) represented by Formula 3A as a first additive and 0.1 wt % of LiODFB and 5.0 wt % of LiBOB as a second additive (see Table 1 below).

Example 1-3

A lithium secondary battery was prepared in the same manner as in Example 1-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution for a secondary battery was prepared by adding 0.1 wt % of the oligomer (weight-average molecular weight (Mw)=12,000, molar ratio of n1:m1 was 80:20) represented by Formula 3A as a first additive and 5.0 wt % of LiODFB and 5.0 wt % of LiBOB as a second additive (see Table 1 below).

Example 1-4

A lithium secondary battery was prepared in the same manner as in Example 1-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution for a secondary battery was prepared by adding 0.1 wt % of the oligomer (weight-average molecular weight (Mw)=12,000, molar ratio of n1:m1 was 80:20) represented by Formula 3A as a first additive and 0.05 wt % of LiBOB as a second additive (see Table 1 below).

Example 1-5

A lithium secondary battery was prepared in the same manner as in Example 1-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution for a secondary battery was prepared by adding 0.1 wt % of the oligomer (weight-average molecular weight (Mw)=12,000, molar ratio of n1:m1 was 80:20) represented by Formula 3A as a first additive and 0.05 wt % of LiODFB as a second additive (see Table 1 below).

Example 1-6

A lithium secondary battery was prepared in the same manner as in Example 1-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution for a secondary battery was prepared by adding 3.0 wt % of the oligomer (weight-average molecular weight (Mw)=12,000, molar ratio of n1:m1 was 80:20) represented by Formula 3A as a first additive and 0.5 wt % of LiODFB and 5.0 wt % of LiBOB as a second additive (see Table 1 below).

Example 1-7

A lithium secondary battery was prepared in the same manner as in Example 1-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution for a secondary battery was prepared by adding 5.0 wt % of the oligomer (weight-average molecular weight (Mw)=12,000, molar ratio of n1:m1 was 80:20) represented by Formula 3A as a first additive and 0.05 wt % of LiODFB and 5.0 wt % of LiBOB as a second additive (see Table 1 below).

Example 1-8

A lithium secondary battery was prepared in the same manner as in Example 1-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution for a secondary battery was prepared by adding 5.0 wt % of the oligomer (weight-average molecular weight (Mw)=12,000, molar ratio of n1:m1 was 80:20) represented by Formula 3A as a first additive and 5.0 wt % of LiODFB and 0.05 wt % of LiBOB as a second additive (see Table 1 below).

Example 1-9

A lithium secondary battery was prepared in the same manner as in Example 1-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution for a secondary battery was prepared by adding 5.0 wt % of the oligomer (weight-average molecular weight (Mw)=12,000, molar ratio of n1:m1 was 80:20) represented by Formula 3A as a first additive and 0.05 wt % of LiODFB and 0.05 wt % of LiBOB as a second additive (see Table 1 below).

Example 1-10

A lithium secondary battery was prepared in the same manner as in Example 1-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution for a secondary battery was prepared by adding 5.0 wt % of the oligomer (weight-average molecular weight (Mw)=12,000, molar ratio of n1:m1 was 80:20) represented by Formula 3A as a first additive and 5.0 wt % of LiODFB as a second additive (see Table 1 below).

Example 1-11

A lithium secondary battery was prepared in the same manner as in Example 1-1 except that a non-aqueous electrolyte solution for a secondary battery including the oligomer (weight-average molecular weight (Mw)=12,500, molar ratio of n2:m2 was 80:20) represented by Formula 3B, instead of the oligomer represented by Formula 3A, as a first additive was prepared (see Table 1 below).

Example 1-12

A pouch-type lithium secondary battery was prepared in the same manner as in Example 1-9 except that a non-aqueous electrolyte solution for a secondary battery including the oligomer (weight-average molecular weight (Mw) =12,500, molar ratio of n2:m2 was 80:20) represented by Formula 3B, instead of the oligomer represented by Formula 3A, as a first additive was prepared (see Table 1 below).

Example 1-13

A pouch-type lithium secondary battery was prepared in the same manner as in Example 1-1 except that a non-aqueous electrolyte solution for a secondary battery including the oligomer (weight-average molecular weight (Mw)=15,500, molar ratio of n3:m3 was 80:20) represented by Formula 3C, instead of the oligomer represented by Formula 3A, as a first additive was prepared (see Table 1 below).

Example 1-14

A pouch-type lithium secondary battery was prepared in the same manner as in Example 1-9 except that a non-aqueous electrolyte solution for a secondary battery including the oligomer (weight-average molecular weight (Mw)=15,500, molar ratio of n3:m3 was 80:20) represented by Formula 3C, instead of the oligomer represented by Formula 3A, as a first additive was prepared (see Table 1 below).

Example 1-15

A pouch-type lithium secondary battery was prepared in the same manner as in Example 1-1 except that a non-aqueous electrolyte solution for a secondary battery including the oligomer (weight-average molecular weight (Mw) =13,300, molar ratio of n4:m4 was 70:30) represented by Formula 3D, instead of the oligomer represented by Formula 3A, as a first additive was prepared (see Table 1 below).

Example 1-16

A pouch-type lithium secondary battery was prepared in the same manner as in Example 1-9 except that a non-aqueous electrolyte solution for a secondary battery including the oligomer (weight-average molecular weight (Mw)=13,300, molar ratio of n4:m4 was 70:30) represented by Formula 3D, instead of the oligomer represented by Formula 3A, as a first additive was prepared (see Table 1 below).

Example 1-17

A pouch-type lithium secondary battery was prepared in the same manner as in Example 1-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution for a secondary battery was prepared by adding 0.04 wt % of the oligomer (weight-average molecular weight (Mw)=12,000, molar ratio of n1:m1 was 80:20) represented by Formula 3A as a first additive and 0.05 wt % of LiODFB and 0.05 wt % of LiBOB as a second additive (see Table 1 below).

Example 1-18

A pouch-type lithium secondary battery was prepared in the same manner as in Example 1-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution for a secondary battery was prepared by adding 0.04 wt % of the oligomer (weight-average molecular weight (Mw)=12,000, molar ratio of n1:m1 was 80:20) represented by Formula 3A as a first additive and 0.05 wt % of LiODFB and 5.0 wt % of LiBOB as a second additive (see Table 1 below).

Example 1-19

A pouch-type lithium secondary battery was prepared in the same manner as in Example 1-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution for a secondary battery was prepared by adding 0.04 wt % of the oligomer (weight-average molecular weight (Mw)=12,000, molar ratio of n1:m1 was 80:20) represented by Formula 3A as a first additive and 5.0 wt % of LiODFB and 5.0 wt % of LiBOB as a second additive (see Table 1 below).

Example 1-20

A pouch-type lithium secondary battery was prepared in the same manner as in Example 1-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution for a secondary battery was prepared by adding 6.0 wt % of the oligomer (weight-average molecular weight (Mw)=12,000, molar ratio of n1:m1 was 80:20) represented by Formula 3A as a first additive and 0.05 wt % of LiODFB and 0.05 wt % of LiBOB as a second additive (see Table 1 below).

Example 1-21

A pouch-type lithium secondary battery was prepared in the same manner as in Example 1-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution for a secondary battery was prepared by adding 6.0 wt % of the oligomer (weight-average molecular weight (Mw)=12,000, molar ratio of n1:m1 was 80:20) represented by Formula 3A as a first additive and 0.05 wt % of LiODFB and 5.0 wt % of LiBOB as a second additive (see Table 1 below).

Example 1-22

A pouch-type lithium secondary battery was prepared in the same manner as in Example 1-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution for a secondary battery was prepared by adding 6.0 wt % of the oligomer (weight-average molecular weight (Mw)=12,000, molar ratio of n1:m1 was 80:20) represented by Formula 3A as a first additive and 5.0 wt % of LiODFB and 5.0 wt % of LiBOB as a second additive (see Table 1 below).

Comparative Example 1-1

A pouch-type lithium secondary battery was prepared in the same manner as in Example 1-1 except that, after ethylene carbonate (EC), propylene carbonate (PC), ethyl propionate (EP), and propyl propionate (PP) were mixed in a volume ratio of 2:1:2.5:4.5, $LiPF_6$ was dissolved such that a concentration of the $LiPF_6$ was 1.0 M to prepare a non-aqueous electrolyte solution (see Table 1 below).

Comparative Example 1-2

A pouch-type lithium secondary battery was prepared in the same manner as in Example 1-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 0.05 wt % of LiODFB and 0.05 wt % of LiBOB as a second additive (see Table 1 below).

Comparative Example 1-3

A pouch-type lithium secondary battery was prepared in the same manner as in Example 1-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 5.0 wt % of LiODFB and 0.05 wt % of LiBOB as a second additive (see Table 1 below).

Comparative Example 1-4

A pouch-type lithium secondary battery was prepared in the same manner as in Example 1-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by only adding 0.1 wt % of the oligomer (weight-average molecular weight (Mw)=12,000, molar ratio of n1:m1 was 80:20) represented by Formula 3A as a first additive.

Comparative Example 1-5

A pouch-type lithium secondary battery was prepared in the same manner as in Example 1-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 5 wt % of an oligomer (weight-average molecular weight (Mw)=7,500, o=40) represented by the following Formula 1A as a first additive and 5.0 wt % of LiODFB and 0.05 wt % of LiBOB as a second additive (see Table 1 below).

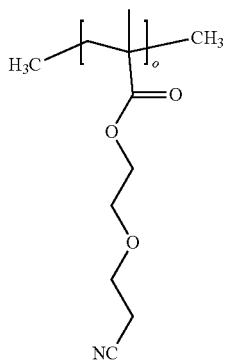

[Formula 1A]

Comparative Example 1-6

A pouch-type lithium secondary battery was prepared in the same manner as in Example 1-1 except that, after LiPF$_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the LiPF$_6$ was 1.0 M, a non-aqueous electrolyte solution was prepared by adding 5 wt % of the oligomer (weight-average molecular weight (Mw)=7,500, o=40) represented by Formula 1A as a first additive and 0.05 wt % of LiODFB and 0.05 wt % of LiBOB as a second additive (see Table 1 below).

Comparative Example 1-7

A pouch-type lithium secondary battery was prepared in the same manner as in Example 1-1 except that, after LiPF$_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the LiPF$_6$ was 1.0 M, a non-aqueous electrolyte solution was prepared by adding 5 wt % of an oligomer (weight-average molecular weight (Mw)=4,000, p=40) represented by the following Formula 2A as a first additive and 0.05 wt % of LiODFB and 0.05 wt % of LiBOB as a second additive (see Table 1 below).

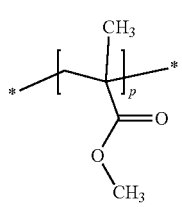

[Formula 2A]

Comparative Example 1-8

A pouch-type lithium secondary battery was prepared in the same manner as in Example 1-1 except that, after LiPF$_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the LiPF$_6$ was 1.0 M, a non-aqueous electrolyte solution was prepared by adding 5 wt % of the oligomer (weight-average molecular weight (Mw)=4,000, p=40) represented by Formula 2A as a first additive and 5.0 wt % of LiODFB and 0.05 wt % of LiBOB as a second additive (see Table 1 below).

Comparative Example 1-9

A pouch-type lithium secondary battery was prepared in the same manner as in Example 1-1 except that a non-aqueous electrolyte solution for a secondary battery including an oligomer (weight-average molecular weight (Mw)=13,500, molar ratio of q:r was 50:50) represented by the following Formula 4, instead of the oligomer represented by Formula 3A, was prepared (see Table 1 below).

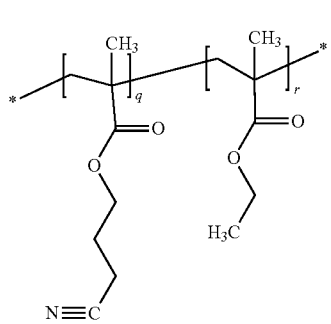

[Formula 4]

Comparative Example 1-10

A pouch-type lithium secondary battery was prepared in the same manner as in Example 1-1 except that a non-aqueous electrolyte solution for a secondary battery including an oligomer (weight-average molecular weight (Mw)=14,200, molar ratio of q1:r1 was 60:40) represented by the following Formula 5, instead of the oligomer represented by Formula 3A, was prepared (see Table 1 below).

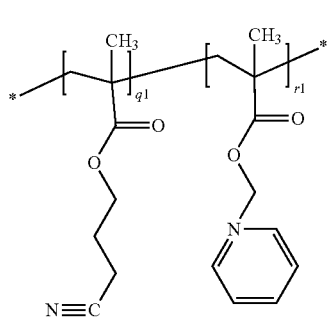

[Formula 5]

TABLE 1

| | First additive: oligomer | | Second additive: lithium salt compound (amount/wt %) | |
|---|---|---|---|---|
| | Formula | Amount (wt %) | LiODFB | LiBOB |
| Example 1-1 | 3A | 0.1 | 0.05 | 0.05 |
| Example 1-2 | 3A | | 0.1 | 5.0 |
| Example 1-3 | 3A | | 5.0 | 5.0 |
| Example 1-4 | 3A | | — | 0.05 |

TABLE 1-continued

| | First additive: oligomer | | Second additive: lithium salt compound (amount/wt %) | |
|---|---|---|---|---|
| | Formula | Amount (wt %) | LiODFB | LiBOB |
| Example 1-5 | 3A | | 0.05 | — |
| Example 1-6 | 3A | 3.0 | 0.5 | 5.0 |
| Example 1-7 | 3A | 5.0 | 0.05 | 5.0 |
| Example 1-8 | 3A | | 5.0 | 0.05 |
| Example 1-9 | 3A | | 0.05 | 0.05 |
| Example 1-10 | 3A | | 5.0 | — |
| Example 1-11 | 3B | 0.1 | 0.05 | 0.05 |
| Example 1-12 | 3B | 5.0 | 0.05 | 0.05 |
| Example 1-13 | 3C | 0.1 | 0.05 | 0.05 |
| Example 1-14 | 3C | 5.0 | 0.05 | 0.05 |
| Example 1-15 | 3D | 0.1 | 0.05 | 0.05 |
| Example 1-16 | 3D | 5.0 | 0.05 | 0.05 |
| Example 1-17 | 3A | 0.04 | 0.05 | 0.05 |
| Example 1-18 | 3A | 0.04 | 0.05 | 5.0 |
| Example 1-19 | 3A | 0.04 | 5.0 | 5.0 |
| Example 1-20 | 3A | 6.0 | 0.05 | 0.05 |
| Example 1-21 | 3A | 6.0 | 0.05 | 5.0 |
| Example 1-22 | 3A | 6.0 | 5.0 | 5.0 |
| Comparative Example 1-1 | — | — | — | — |
| Comparative Example 1-2 | — | — | 0.05 | 0.05 |
| Comparative Example 1-3 | — | — | 5.0 | 0.05 |
| Comparative Example 1-4 | 3A | 0.1 | — | — |
| Comparative Example 1-5 | 1A | 5.0 | 5.0 | 0.05 |
| Comparative Example 1-6 | 1A | | 0.05 | 0.05 |
| Comparative Example 1-7 | 2A | | 0.05 | 0.05 |
| Comparative Example 1-8 | 2A | | 5.0 | 0.05 |
| Comparative Example 1-9 | 4 | 0.1 | 0.05 | 0.05 |
| Comparative Example 1-10 | 5 | 0.1 | 0.05 | 0.05 |

The abbreviations of compounds in Table 1 are as follows.
LiBOB: lithium bis(oxalato)borate
LiODFB: lithium difluoro(oxalato)borate Example 2-1

A pouch-type lithium secondary battery was prepared in the same manner as in Example 1-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 0.1 wt % of the oligomer (weight-average molecular weight (Mw)=13,000 g/mol, molar ratio of n5:m5=80:20) represented by Formula 3E as a first additive and 0.0005 wt % of succinonitrile as a second additive (see Table 2 below).

Example 2-2

A pouch-type lithium secondary battery was prepared in the same manner as in Example 2-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 0.1 wt % of the oligomer (weight-average molecular weight (Mw)=13,000 g/mol, molar ratio of n5:m5=80:20) represented by Formula 3E as a first additive and 0.0005 wt % of succinonitrile and 10.0 wt % of HTCN as a second additive (see Table 2 below).

Example 2-3

A pouch-type lithium secondary battery was prepared in the same manner as in Example 2-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 0.1 wt % of the oligomer (weight-average molecular weight (Mw)=13,000 g/mol, molar ratio of n5:m5=80:20) represented by Formula 3E as a first additive and 0.0005 wt % of HTCN as a second additive (see Table 2 below).

Example 2-4

A pouch-type lithium secondary battery was prepared in the same manner as in Example 2-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 0.1 wt % of the oligomer (weight-average molecular weight (Mw)=13,000 g/mol, molar ratio of n5:m5=80:20) represented by Formula 3E as a first additive and 10.0 wt % of succinonitrile and 0.0005 wt % of HTCN as a second additive (see Table 2 below).

Example 2-5

A pouch-type lithium secondary battery was prepared in the same manner as in Example 2-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 0.1 wt % of the oligomer (weight-average molecular weight (Mw)=13,000 g/mol, molar ratio of n5:m5=80:20) represented by Formula 3E as a first additive and 10.0 wt % of succinonitrile as a second additive (see Table 2 below).

Example 2-6

A pouch-type lithium secondary battery was prepared in the same manner as in Example 2-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 0.1 wt % of the oligomer (weight-average molecular weight (Mw)=13,000 g/mol, molar ratio of n5:m5=80:20) represented by Formula 3E as a first additive and 10.0 wt % of HTCN as a second additive (see Table 2 below).

Example 2-7

A pouch-type lithium secondary battery was prepared in the same manner as in Example 2-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the LiPF$_6$ was 1.0 M, a non-aqueous electrolyte solution was prepared by adding 0.1 wt % of the oligomer (weight-average molecular weight (Mw)=16,500 g/mol, molar ratio of n6:m6=70:30) represented by Formula 3F as a first additive and 0.0005 wt % of succinonitrile as a second additive (see Table 2 below).

Example 2-8

A pouch-type lithium secondary battery was prepared in the same manner as in Example 2-1 except that, after LiPF$_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the LiPF$_6$ was 1.0 M, a non-aqueous electrolyte solution was prepared by adding 0.1 wt % of the oligomer (weight-average molecular weight (Mw)=16,500 g/mol, molar ratio of n6:m6=70:30) represented by Formula 3F as a first additive and 0.0005 wt % of succinonitrile and 10.0 wt % of HTCN as a second additive (see Table 2 below).

Example 2-9

A pouch-type lithium secondary battery was prepared in the same manner as in Example 2-1 except that, after LiPF$_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the LiPF$_6$ was 1.0 M, a non-aqueous electrolyte solution was prepared by adding 0.1 wt % of the oligomer (weight-average molecular weight (Mw)=15,500 g/mol, molar ratio of n3:m3=80:20) represented by Formula 3C as a first additive and 0.0005 wt % of succinonitrile as a second additive (see Table 2 below).

Example 2-10

A pouch-type lithium secondary battery was prepared in the same manner as in Example 2-1 except that, after LiPF$_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the LiPF$_6$ was 1.0 M, a non-aqueous electrolyte solution was prepared by adding 0.1 wt % of the oligomer (weight-average molecular weight (Mw)=15,500 g/mol, molar ratio of n3:m3=80:20) represented by Formula 3C as a first additive and 0.0005 wt % of succinonitrile and 10.0 wt % of HTCN as a second additive (see Table 2 below).

Example 2-11

A pouch-type lithium secondary battery was prepared in the same manner as in Example 2-1 except that, after LiPF$_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the LiPF$_6$ was 1.0 M, a non-aqueous electrolyte solution was prepared by adding 0.1 wt % of the oligomer (weight-average molecular weight (Mw)=15,000 g/mol, molar ratio of n4:m4=90:10) represented by Formula 3D as a first additive and 0.0005 wt % of succinonitrile as a second additive (see Table 2 below).

Example 2-12

A pouch-type lithium secondary battery was prepared in the same manner as in Example 2-1 except that, after LiPF$_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the LiPF$_6$ was 1.0 M, a non-aqueous electrolyte solution was prepared by adding 0.1 wt % of the oligomer (weight-average molecular weight (Mw)=15,000 g/mol, molar ratio of n4:m4=90:10) represented by Formula 3D as a first additive and 0.0005 wt % of succinonitrile and 10.0 wt % of HTCN as a second additive (see Table 2 below).

Example 2-13

A pouch-type lithium secondary battery was prepared in the same manner as in Example 2-1 except that, after LiPF$_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the LiPF$_6$ was 1.0 M, a non-aqueous electrolyte solution was prepared by adding 0.1 wt % of the oligomer (weight-average molecular weight (Mw)=13,000 g/mol, molar ratio of n5:m5=80:20) represented by Formula 3E as a first additive and 0.0001 wt % of succinonitrile as a second additive (see Table 2 below).

Example 2-14

A pouch-type lithium secondary battery was prepared in the same manner as in Example 2-1 except that, after LiPF$_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the LiPF$_6$ was 1.0 M, a non-aqueous electrolyte solution was prepared by adding 0.1 wt % of the oligomer (weight-average molecular weight (Mw)=13,000 g/mol, molar ratio of n5:m5=80:20) represented by Formula 3E as a first additive and 0.0001 wt % of HTCN as a second additive (see Table 2 below).

Example 2-15

A pouch-type lithium secondary battery was prepared in the same manner as in Example 2-1 except that, after LiPF$_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the LiPF$_6$ was 1.0 M, a non-aqueous electrolyte solution was prepared by adding 0.1 wt % of the oligomer (weight-average molecular weight (Mw)=13,000 g/mol, molar ratio of n5:m5=80:20) represented by Formula 3E as a first additive and 15.0 wt % of succinonitrile as a second additive (see Table 2 below).

Example 2-16

A pouch-type lithium secondary battery was prepared in the same manner as in Example 2-1 except that, after LiPF$_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the LiPF$_6$ was 1.0 M, a non-aqueous electrolyte solution was prepared by adding 0.1 wt % of the oligomer (weight-average molecular weight (Mw)=13,000 g/mol, molar ratio of n5:m5=80:20) represented by Formula 3E as a first additive and 15.0 wt % of HTCN as a second additive (see Table 2 below).

Example 2-17

A pouch-type lithium secondary battery was prepared in the same manner as in Example 2-1 except that, after LiPF$_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the LiPF$_6$ was 1.0 M, a non-aqueous electrolyte solution was prepared by adding 0.1 wt % of the oligomer (weight-average molecular weight (Mw)=13,000 g/mol, molar ratio of n5:m5=80:20) represented by Formula 3E as a first additive and 0.0001 wt % of succinonitrile and 10.0 wt % of HTCN as a second additive (see Table 2 below).

Example 2-18

A pouch-type lithium secondary battery was prepared in the same manner as in Example 2-1 except that, after LiPF$_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the LiPF$_6$ was 1.0 M, a non-aqueous electrolyte solution was prepared by adding 0.1 wt % of the oligomer (weight-average molecular weight (Mw)=13,000 g/mol, molar ratio of n5:m5=80:20) represented by Formula 3E as a first additive and 10.0 wt % of succinonitrile and 0.0001 wt % of HTCN as a second additive (see Table 2 below).

Example 2-19

A pouch-type lithium secondary battery was prepared in the same manner as in Example 2-1 except that, after LiPF$_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the LiPF$_6$ was 1.0 M, a non-aqueous electrolyte solution was prepared by adding 6.0 wt % of the oligomer (weight-average molecular weight (Mw)=13,000 g/mol, molar ratio of n5:m5=80:20) represented by Formula 3E as a first additive and 6.0 wt % of succinonitrile and 6.0 wt % of HTCN as a second additive (see Table 2 below).

Example 2-20

A pouch-type lithium secondary battery was prepared in the same manner as in Example 2-1 except that, after LiPF$_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the LiPF$_6$ was 1.0 M, a non-aqueous electrolyte solution was prepared by adding 6.0 wt % of the oligomer (weight-average molecular weight (Mw)=13,000 g/mol, molar ratio of n5:m5=80:20) represented by Formula 3E as a first additive and 6.0 wt % of succinonitrile as a second additive (see Table 2 below).

Example 2-21

A pouch-type lithium secondary battery was prepared in the same manner as in Example 2-1 except that, after LiPF$_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the LiPF$_6$ was 1.0 M, a non-aqueous electrolyte solution was prepared by adding 6.0 wt % of the oligomer (weight-average molecular weight (Mw)=13,000 g/mol, molar ratio of n5:m5=80:20) represented by Formula 3E as a first additive and 6.0 wt % of HTCN as a second additive (see Table 2 below).

Example 2-22

A pouch-type lithium secondary battery was prepared in the same manner as in Example 2-1 except that, after LiPF$_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the LiPF$_6$ was 1.0 M, a non-aqueous electrolyte solution was prepared by adding 0.05 wt % of the oligomer (weight-average molecular weight (Mw)=13,000 g/mol, molar ratio of n5:m5=80:20) represented by Formula 3E as a first additive and 6.0 wt % of succinonitrile as a second additive (see Table 2 below).

Example 2-23

A pouch-type lithium secondary battery was prepared in the same manner as in Example 2-1 except that, after LiPF$_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the LiPF$_6$ was 1.0 M, a non-aqueous electrolyte solution was prepared by adding 0.05 wt % of the oligomer (weight-average molecular weight (Mw)=13,000 g/mol, molar ratio of n5:m5=80:20) represented by Formula 3E as a first additive and 6.0 wt % of succinonitrile and 6.0 wt % of HTCN as a second additive (see Table 2 below).

Example 2-24

A pouch-type lithium secondary battery was prepared in the same manner as in Example 2-1 except that, after LiPF$_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the LiPF$_6$ was 1.0 M, a non-aqueous electrolyte solution was prepared by adding 0.05 wt % of the oligomer (weight-average molecular weight (Mw)=13,000 g/mol, molar ratio of n5:m5=80:20) represented by Formula 3E as a first additive and 6.0 wt % of HTCN as a second additive (see Table 2 below).

Comparative Example 2-1

A pouch-type lithium secondary battery was prepared in the same manner as in Example 2-1 except that, after LiPF$_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 0.1 wt % of the oligomer (weight-average molecular weight (Mw) 10=13,000 g/mol, molar ratio of n5:m5=80:20) represented by Formula 3E (see Table 2 below).

TABLE 2

|  | First additive: oligomer | | Second additive: nitrile-based compound (amount/wt %) | |
| --- | --- | --- | --- | --- |
|  | Formula | Amount (wt %) | SN | HTCN |
| Example 2-1 | 3E | 0.1 | 0.0005 | — |
| Example 2-2 | 3E |  | 0.0005 | 10 |
| Example 2-3 | 3E |  | — | 0.0005 |
| Example 2-4 | 3E |  | 10 | 0.0005 |
| Example 2-5 | 3E |  | 10 | — |
| Example 2-6 | 3E |  | — | 10 |
| Example 2-7 | 3F |  | 0.0005 | — |
| Example 2-8 | 3F |  | 0.0005 | 10 |
| Example 2-9 | 3C |  | 0.0005 | — |
| Example 2-10 | 3C |  | 0.0005 | 10 |
| Example 2-11 | 3D |  | 0.0005 | — |
| Example 2-12 | 3D |  | 0.0005 | 10 |
| Example 2-13 | 3E |  | 0.0001 | — |
| Example 2-14 | 3E |  | — | 0.0001 |
| Example 2-15 | 3E |  | 15 | — |
| Example 2-16 | 3E |  | — | 15 |
| Example 2-17 | 3E |  | 0.0001 | 10 |
| Example 2-18 | 3E |  | 10 | 0.0001 |
| Example 2-19 | 3E | 6 | 6 | 6 |
| Example 2-20 | 3E |  | 6 | — |
| Example 2-21 | 3E |  | — | 6 |
| Example 2-22 | 3E | 0.05 | 6 | — |
| Example 2-23 | 3E |  | 6 | 6 |
| Example 2-24 | 3E |  | — | 6 |
| Comparative Example 2-1 | 3E | 0.1 | — | — |

The abbreviations of compounds in Table 2 are as follows.
SN: succinonitrile
HTCN: hexanetricarbonitrile Example 3-1

A pouch-type lithium secondary battery was prepared in the same manner as in Example 1-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 0.1 wt % of the oligomer (weight-average molecular weight (Mw)=15,000 g/mol, molar ratio of n5:m5=60:40) represented by Formula 3E as a first additive and 0.0001 wt % of vinylethylene carbonate and 0.0001 wt % of fluoroethylene carbonate as a second additive (see Table 3 below).

Example 3-2

A pouch-type lithium secondary battery was prepared in the same manner as in Example 3-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 0.1 wt % of the oligomer (weight-average molecular weight (Mw)=15,000 g/mol, molar ratio of n5:m5=60:40) represented by Formula 3E as a first additive and 0.0001 wt % of vinylethylene carbonate and 10 wt % of fluoroethylene carbonate as a second additive (see Table 3 below).

Example 3-3

A pouch-type lithium secondary battery was prepared in the same manner as in Example 3-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 0.1 wt % of the oligomer (weight-average molecular weight (Mw)=15,000 g/mol, molar ratio of n5:m5=60:40) represented by Formula 3E as a first additive and 5.0 wt % of vinylethylene carbonate and 0.0001 wt % of fluoroethylene carbonate as a second additive (see Table 3 below).

Example 3-4

A pouch-type lithium secondary battery was prepared in the same manner as in Example 3-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 0.1 wt % of the oligomer (weight-average molecular weight (Mw)=15,000 g/mol, molar ratio of n5:m5=60:40) represented by Formula 3E as a first additive and 5.0 wt % of vinylethylene carbonate and 10 wt % of fluoroethylene carbonate as a second additive (see Table 3 below).

Example 3-5

A pouch-type lithium secondary battery was prepared in the same manner as in Example 3-1 except that a non-aqueous electrolyte solution was prepared by adding the oligomer (weight-average molecular weight (Mw)=15,000 g/mol, molar ratio of n6:m6=50:50) represented by Formula 3F, instead of the oligomer represented by Formula 3E, as a first additive (see Table 3 below).

Example 3-6

A pouch-type lithium secondary battery was prepared in the same manner as in Example 3-2 except that a non-aqueous electrolyte solution was prepared by adding the oligomer (weight-average molecular weight (Mw)=15,000 g/mol, molar ratio of n6:m6=50:50) represented by Formula 3F, instead of the oligomer represented by Formula 3E, as a first additive (see Table 3 below).

Example 3-7

A pouch-type lithium secondary battery was prepared in the same manner as in Example 3-1 except that a non-aqueous electrolyte solution was prepared by adding the oligomer (weight-average molecular weight (Mw)=14,300 g/mol, molar ratio of n3:m3=60:40) represented by Formula 3C, instead of the oligomer represented by Formula 3E, as a first additive (see Table 3 below).

Example 3-8

A pouch-type lithium secondary battery was prepared in the same manner as in Example 3-2 except that a non-aqueous electrolyte solution was prepared by adding the oligomer (weight-average molecular weight (Mw)=14,300 g/mol, molar ratio of n3:m3=60:40) represented by Formula 3C, instead of the oligomer represented by Formula 3E, as a first additive (see Table 3 below).

Example 3-9

A pouch-type lithium secondary battery was prepared in the same manner as in Example 3-1 except that a non-aqueous electrolyte solution was prepared by adding the oligomer (weight-average molecular weight (Mw)=12,000 g/mol, molar ratio of n4:m4=60:40) represented by Formula 3D, instead of the oligomer represented by Formula 3E, as a first additive (see Table 3 below).

Example 3-10

A pouch-type lithium secondary battery was prepared in the same manner as in Example 3-2 except that a non-aqueous electrolyte solution was prepared by adding the oligomer (weight-average molecular weight (Mw)=12,000 g/mol, molar ratio of n4:m4=60:40) represented by Formula 3D, instead of the oligomer represented by Formula 3E, as a first additive (see Table 3 below).

Example 3-11

A pouch-type lithium secondary battery was prepared in the same manner as in Example 3-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 0.05 wt % of the oligomer (weight-average molecular weight (Mw)=15,000 g/mol, molar ratio of n5:m5=60:40) represented by Formula 3E as a first additive and 0.00005 wt % of vinylethylene carbonate and 0.00005 wt % of fluoroethylene carbonate as a second additive (see Table 3 below).

Example 3-12

A pouch-type lithium secondary battery was prepared in the same manner as in Example 3-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 6 wt % of the oligomer (weight-average molecular weight (Mw)=15,000 g/mol, molar ratio of n5:m5=60:40) represented by Formula 3E as a first additive and 0.006 wt % of vinylethylene carbonate and 0.006 wt % of fluoroethylene carbonate as a second additive (see Table 3 below).

Example 3-13

A pouch-type lithium secondary battery was prepared in the same manner as in Example 3-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 0.1 wt % of the oligomer (weight-average molecular weight (Mw)=15,000 g/mol, molar ratio of n5:m5=60:40) represented by Formula 3E as a first additive and 0.0001 wt % of vinylethylene carbonate as a second additive (see Table 3 below).

Example 3-14

A pouch-type lithium secondary battery was prepared in the same manner as in Example 3-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 0.1 wt % of the oligomer (weight-average molecular weight (Mw)=15,000 g/mol, molar ratio of n5:m5=60:40) represented by Formula 3E as a first additive and 0.0001 wt % of fluoroethylene carbonate as a second additive (see Table 3 below).

Example 3-15

A pouch-type lithium secondary battery was prepared in the same manner as in Example 3-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 0.1 wt % of the oligomer (weight-average molecular weight (Mw)=15,000 g/mol, molar ratio of n5:m5=60:40) represented by Formula 3E as a first additive and 5.0 wt % of vinylethylene carbonate as a second additive (see Table 3 below).

Example 3-16

A pouch-type lithium secondary battery was prepared in the same manner as in Example 3-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 0.1 wt % of the oligomer (weight-average molecular weight (Mw)=15,000 g/mol, molar ratio of n5:m5=60:40) represented by Formula 3E as a first additive and 10 wt % of fluoroethylene carbonate as a second additive (see Table 3 below).

Example 3-17

A pouch-type lithium secondary battery was prepared in the same manner as in Example 3-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 0.1 wt % of the oligomer (weight-average molecular weight (Mw)=15,000 g/mol, molar ratio of n5:m5=60:40) represented by Formula 3E as a first additive and 10 wt % of vinylethylene carbonate as a second additive (see Table 3 below).

Example 3-18

A pouch-type lithium secondary battery was prepared in the same manner as in Example 3-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 0.1 wt % of the oligomer (weight-average molecular weight (Mw)=15,000 g/mol, molar ratio of n5:m5=60:40) represented by Formula 3E as a first additive and 15 wt % of fluoroethylene carbonate as a second additive (see Table 3 below).

Comparative Example 3-1

A pouch-type lithium secondary battery was prepared in the same manner as in Example 3-1 except that, after $LiPF_6$ was dissolved in a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.0 M, a non-aqueous electrolyte solution was prepared by adding 0.1 wt % of the oligomer (weight-average molecular weight (Mw)=15,000 g/mol, molar ratio of n5:m5=60:40) represented by Formula 3E (see Table 3 below).

TABLE 3

| | First additive: oligomer | | Second additive: cyclic carbonate-based compound (amount/wt %) | |
|---|---|---|---|---|
| | Formula | Amount (wt %) | VEC | FEC |
| Example 3-1 | 3E | 0.1 | 0.0001 | 0.0001 |
| Example 3-2 | 3E | | 0.0001 | 10 |
| Example 3-3 | 3E | | 5.0 | 0.0001 |
| Example 3-4 | 3E | | 5.0 | 10 |
| Example 3-5 | 3F | | 0.0001 | 0.0001 |
| Example 3-6 | 3F | | 0.0001 | 10 |
| Example 3-7 | 3C | | 0.0001 | 0.0001 |
| Example 3-8 | 3C | | 0.0001 | 10 |
| Example 3-9 | 3D | | 0.0001 | 0.0001 |
| Example 3-10 | 3D | | 0.0001 | 10 |
| Example 3-11 | 3E | 0.05 | 0.00005 | 0.00005 |
| Example 3-12 | 3E | 6 | 0.006 | 0.006 |
| Example 3-13 | 3E | 0.1 | 0.0001 | — |
| Example 3-14 | 3E | | — | 0.0001 |
| Example 3-15 | 3E | | 5.0 | — |
| Example 3-16 | 3E | | — | 10 |
| Example 3-17 | 3E | | 10 | — |
| Example 3-18 | 3E | | — | 15 |
| Comparative Example 3-1 | 3E | | — | — |

The abbreviations of compounds in Table 3 are as follows.
VEC: vinylethylene carbonate
FEC: fluoroethylene carbonate II. Experimental Examples Experimental Example 1-1: Evaluation of Capacity Retention at High Temperature (45° C.)

After formation was performed at a current of 200 mA (0.1 C rate) on each of the lithium secondary batteries prepared in Examples 1-1 to 1-4, 1-6 to 1-9, and 1-11 to 1-22 and the lithium secondary batteries prepared in Comparative Examples 1-1 and 1-4 to 1-10, discharge capacity in this case was set as initial capacity, and resistance measured was set as initial resistance.

Then, after constant current/constant voltage (CC/CV) charging at 660 mA (0.33 C, 0.05 C cut-off) to 4.2 V and CC discharging at 660 mA (0.33 C) to 2.5 V were set as one cycle to perform 100 cycles at a high temperature (45° C.), discharge capacity and resistance were measured.

After a capacity retention was calculated by comparing discharge capacity after 100 cycles and the initial capacity, the results thereof are presented in Table 4 below.

Experimental Example 1-2: High-Temperature (45° C.) Storage Characteristics Evaluation Discharge capacity, after each of the lithium secondary batteries prepared in Examples 1-1 to 1-4, 1-6 to 1-9, and 1-11 to 1-22 and the lithium secondary batteries prepared in Comparative Examples 1-1 and 1-4 to 1-10 was charged at 0.33 C rate to 4.2 V under a constant current/constant voltage condition, 0.05 C cut-off charged, and discharged at 0.33 C to 2.5 V, was set as initial capacity, and resistance in this case was set as initial resistance.

Then, residual capacity and resistance, after each lithium secondary was charged at 0.33 C rate to 4.2 V under a constant current/constant voltage condition, 0.05 C cut-off charged, and stored at 60° C. for 10 weeks, were measured. A capacity retention was calculated by comparing the discharge capacity measured after 10 weeks of storage at high temperature and the initial capacity, and the results thereof are presented in Table 4 below.

TABLE 4

| Electrolyte solution | Capacity retention after 100 cycles at high temperature (45° C.) (%) | Capacity retention after 10 weeks of storage at high temperature (45° C.) (%) |
|---|---|---|
| Example 1-1 | 95 | 95 |
| Example 1-2 | 97 | 96 |
| Example 1-3 | 97 | 96 |
| Example 1-4 | 96 | 98 |
| Example 1-6 | 96 | 97 |
| Example 1-7 | 98 | 96 |
| Example 1-8 | 97 | 95 |
| Example 1-9 | 97 | 96 |
| Example 1-11 | 97 | 98 |
| Example 1-12 | 95 | 98 |
| Example 1-13 | 98 | 98 |
| Example 1-14 | 96 | 97 |
| Example 1-15 | 97 | 97 |
| Example 1-16 | 97 | 96 |
| Example 1-17 | 89 | 88 |
| Example 1-18 | 87 | 84 |
| Example 1-19 | 86 | 87 |
| Example 1-20 | 86 | 88 |
| Example 1-21 | 87 | 85 |
| Example 1-22 | 85 | 85 |
| Comparative Example 1-1 | 74 | 72 |
| Comparative Example 1-4 | 82 | 88 |
| Comparative Example 1-5 | 83 | 82 |
| Comparative Example 1-6 | 81 | 84 |
| Comparative Example 1-7 | 85 | 81 |
| Comparative Example 1-8 | 80 | 80 |
| Comparative Example 1-9 | 80 | 79 |
| Comparative Example 1-10 | 78 | 79 |

Referring to the results of Table 4, with respect to the secondary batteries of Comparative Examples 1-1 and 1-4 to 1-10 which did not include both the first additive and the second additive of the present disclosure, since it was difficult to form a uniform film, it may be understood that both capacity retention after high-temperature cycles and capacity retention after high-temperature storage were degraded in comparison to those of the secondary batteries respectively including the non-aqueous electrolyte solutions of Examples 1-1 to 1-4, 1-6 to 1-9, and 1-11 to 1-22 of the present disclosure.

With respect to the lithium secondary batteries of Examples 1-17 to 1-22 in which a somewhat smaller or greater amount of the oligomer of the present disclosure was included, it may be understood that the capacity retentions were relatively reduced in comparison to those of the secondary batteries of Examples 1-1 to 1-4, 1-6 to 1-9, and 1-11 to 1-16 while a film-forming effect was reduced or a side reaction was caused.

Experimental Example 2-1: Evaluation of Capacity Retention at High Temperature (45° C.)

After formation was performed at a current of 200 mA (0.1 C rate) on the lithium secondary batteries prepared in Examples 2-1 to 2-24 and the lithium secondary batteries prepared in Comparative Examples 1-9 and 1-10, discharge capacity in this case was set as initial capacity, and resistance measured was set as initial resistance.

Then, after constant current/constant voltage (CC/CV) charging at 660 mA (0.33 C, 0.05 C cut-off) to 4.2 V and CC discharging at 660 mA (0.33 C) to 2.5 V were set as one cycle to perform 100 cycles at a high temperature (45° C.), discharge capacity was measured.

After a capacity retention was calculated by comparing discharge capacity after 100 cycles and the initial capacity, the results thereof are presented in Table 5 below.

Experimental Example 2-2: High-Temperature (45° C.) Storage Characteristics Evaluation Discharge capacity, after each of the lithium secondary batteries prepared in Examples 2-1 to 2-24 and the lithium secondary batteries prepared in Comparative Examples 1-9 and 1-10 was charged at 0.33 C rate to 4.2 V under a constant current/constant voltage condition, 0.05 C cut-off charged, and discharged at 0.33 C to 2.5 V, was set as initial capacity, and resistance in this case was set as initial resistance.

Then, residual capacity and resistance, after each lithium secondary was charged at 0.33 C rate to 4.2 V under a constant current/constant voltage condition, 0.05 C cut-off charged, and stored at 60° C. for 10 weeks, were measured. A capacity retention was calculated by comparing the discharge capacity measured after 10 weeks of storage at high temperature and the initial capacity, and the results thereof are presented in Table 5 below.

TABLE 5

| | Capacity retention after 100 cycles at high temperature (45° C.) (%) | Capacity retention after 10 weeks of storage at high temperature (45° C.) (%) |
|---|---|---|
| Example 2-1 | 98 | 97 |
| Example 2-2 | 97 | 96 |
| Example 2-3 | 99 | 97 |
| Example 2-4 | 98 | 98 |
| Example 2-5 | 98 | 96 |
| Example 2-6 | 99 | 97 |
| Example 2-7 | 98 | 98 |
| Example 2-8 | 98 | 98 |
| Example 2-9 | 98 | 96 |
| Example 2-10 | 97 | 97 |
| Example 2-11 | 98 | 97 |
| Example 2-12 | 98 | 97 |
| Example 2-13 | 85 | 80 |
| Example 2-14 | 88 | 82 |
| Example 2-15 | 89 | 85 |
| Example 2-16 | 86 | 84 |
| Example 2-17 | 84 | 88 |
| Example 2-18 | 82 | 89 |
| Example 2-19 | 82 | 84 |
| Example 2-20 | 84 | 81 |
| Example 2-21 | 83 | 82 |
| Example 2-22 | 79 | 80 |
| Example 2-23 | 81 | 82 |
| Example 2-24 | 80 | 83 |
| Comparative Example 1-9 | 80 | 79 |
| Comparative Example 1-10 | 78 | 79 |

Referring to Table 5, with respect to the secondary batteries of Comparative Examples 1-9 and 1-10 which did not include both the first additive and the second additive of the present disclosure, since it was difficult to form a uniform film, it may be understood that both capacity retention after high-temperature cycles and capacity retention after high-temperature storage were degraded in comparison to those of the secondary batteries respectively including the non-aqueous electrolyte solutions of Examples 2-1 to 2-24 of the present disclosure.

With respect to the lithium secondary batteries of Examples 2-1 to 2-18, it may be understood that both the capacity retention after high-temperature cycles and the capacity retention after high-temperature storage were improved in comparison to those of the secondary batteries of Examples 2-19 to 2-24 respectively including the non-aqueous electrolyte solutions in which a somewhat greater or smaller amount of the oligomer was included. This effect seems to be due to the fact that, since the film-forming effect was improved when the oligomer and nitrile-based compound in a specific content ratio were included, an increase in resistance due to the formation of by-product, which may occur on the surface, may be prevented by suppressing electrode degradation that may occur during high-temperature performance evaluation and simultaneously suppressing the side reaction of the electrolyte solution that may occur on the surface of the electrode.

Experimental Example 3-1: Evaluation of Capacity Retention at High Temperature (45° C.)

After formation was performed at a current of 200 mA (0.1 C rate) on the lithium secondary batteries prepared in Examples 3-1 to 3-10 and 3-13 to 3-18, the lithium secondary battery prepared in Comparative Example 1-1, the lithium secondary batteries prepared in Comparative Examples 1-9 and 1-10, and the lithium secondary battery prepared in Comparative Example 3-1, discharge capacity in this case was set as initial capacity, and resistance measured was set as initial resistance.

Then, after constant current/constant voltage (CC/CV) charging at 660 mA (0.33 C, 0.05 C cut-off) to 4.2 V and CC discharging at 660 mA (0.33 C) to 2.5 V were set as one cycle to perform 100 cycles at a high temperature (45° C.), discharge capacity was measured.

After a capacity retention was calculated by comparing discharge capacity after 100 cycles and the initial capacity, the results thereof are presented in Table 6 below.

Experimental Example 3-2: High-Temperature (45° C.) Storage Characteristics Evaluation Discharge capacity, after each of the lithium secondary batteries prepared in Examples 3-1 to 3-14 and 3-16 to 3-18, the lithium secondary battery prepared in Comparative Example 1-1, the lithium secondary batteries prepared in Comparative Examples 1-9 and 1-10, and the lithium secondary battery prepared in Comparative Example 3-1 was charged at 0.33 C rate to 4.2 V under a constant current/constant voltage condition, 0.05 C cut-off charged, and discharged at 0.33 C to 2.5 V, was set as initial capacity, and resistance in this case was set as initial resistance.

Then, residual capacity and resistance, after each lithium secondary was charged at 0.33 C rate to 4.2 V under a constant current/constant voltage condition, 0.05 C cut-off charged, and stored at 60° C. for 10 weeks, were measured. A capacity retention was calculated by comparing the discharge capacity measured after 10 weeks of storage at high temperature and the initial capacity, and the results thereof are presented in Table 6 below.

TABLE 6

|  | Capacity retention after 100 cycles at high temperature (45° C.) (%) | Capacity retention after 10 weeks of storage at high temperature (45° C.) (%) |
| --- | --- | --- |
| Example 3-1 | 98 | 99 |
| Example 3-2 | 97 | 98 |
| Example 3-3 | 96 | 97 |
| Example 3-4 | 95 | 98 |
| Example 3-5 | 99 | 98 |
| Example 3-6 | 97 | 98 |
| Example 3-7 | 98 | 98 |
| Example 3-8 | 97 | 99 |
| Example 3-9 | 98 | 97 |
| Example 3-10 | 97 | 99 |
| Example 3-11 | — | 87 |
| Example 3-12 | — | 88 |
| Example 3-13 | 90 | 81 |
| Example 3-14 | 91 | 80 |
| Example 3-15 | 89 | — |
| Example 3-16 | 86 | 87 |
| Example 3-17 | 84 | 88 |
| Example 3-18 | 89 | 85 |
| Comparative Example 3-1 | 81 | 87 |
| Comparative Example 1-1 | 85 | 84 |
| Comparative Example 1-9 | 80 | 79 |
| Comparative Example 1-10 | 78 | 79 |

Referring to Table 6, with respect to the lithium secondary batteries according to an embodiment of the present disclosure, it may be understood that both capacity retention after high-temperature cycles and capacity retention after high-temperature storage were improved in comparison to those of the secondary batteries of Comparative Examples 1-1, 3-1, 1-9, and 1-10 respectively including the non-aqueous electrolyte solutions which did not include both the first and second additives of the present disclosure.

Specifically, the reason for this seems to be that, since a stable film was formed by including the cyclic carbonate and the oligomer together as an additive, the increase in resistance due to the formation of the by-product, which may occur on the surface, may be prevented by suppressing the electrode degradation that may occur during high-temperature performance evaluation and simultaneously suppressing the side reaction of the electrolyte solution that may occur on the surface of the electrode.

Particularly, with respect to the lithium secondary batteries of Examples 3-1 to 3-10 respectively including the non-aqueous electrolyte solutions containing two types of cyclic carbonate compounds as the second additive, it may be understood that the capacity retention after high-temperature cycles and the capacity retention after high-temperature storage were more improved than those of the secondary batteries of Examples 3-13 to 3-18 respectively including the non-aqueous electrolyte solutions containing only one cyclic carbonate compound.

Also, with respect to the secondary battery of Example 3-11 containing a somewhat smaller amount of the oligomer, since an absolute amount of the oligomer for forming the film was insufficient to form an unstable film, it may be understood that the capacity retention after high-temperature storage was relatively decreased in comparison to the secondary batteries of Examples 3-1 to 3-10. Furthermore, with respect to the secondary battery of Example 3-12 containing a somewhat larger amount of the oligomer, it may be understood that the capacity retention after high-temperature storage was relatively decreased in comparison to the secondary batteries of Examples 3-1 to 3-10 while a charge transfer effect of lithium ions was reduced due to an decrease in ionic conductivity caused by an increase in the viscosity of the electrolyte solution.

Experimental Example 1-3: Safety Evaluation

Discharge capacity, after each of the lithium secondary batteries prepared in Examples 1-1 to 1-19 and the lithium secondary batteries prepared in Comparative Examples 1-1 to 1-10 was charged at 0.33 C rate to 4.2 V under a constant current/constant voltage condition, 0.05 C cut-off charged, and discharged at 0.33 C to 2.5 V, was set as initial capacity, and resistance in this case was set as initial resistance.

Then, after each lithium secondary battery was charged at 0.33 C rate to 4.2 V under a constant current/constant voltage condition and 0.05 C cut-off charged and each of the fully charged cells was heated to 140° C. at a rate of 5° C./min, a stability evaluation test was performed by observing whether ignition or explosion occurred while the temperature was maintained at 140° C. for 1 hour.

The results thereof are presented in Table 7 below. In this case, a case (pass), in which the battery was not ignited or exploded, was indicated as "o", and a case (fail), in which the battery was ignited or exploded, was indicated as "x".

TABLE 7

| Electrolyte solution | Stability evaluation results during high-temperature storage |
| --- | --- |
| Example 1-1 | o |
| Example 1-2 | o |
| Example 1-3 | o |
| Example 1-4 | o |
| Example 1-5 | o |
| Example 1-6 | o |
| Example 1-7 | o |
| Example 1-8 | o |
| Example 1-9 | o |
| Example 1-10 | o |
| Example 1-11 | o |

TABLE 7-continued

| Electrolyte solution | Stability evaluation results during high-temperature storage |
|---|---|
| Example 1-12 | o |
| Example 1-13 | o |
| Example 1-14 | o |
| Example 1-15 | o |
| Example 1-16 | o |
| Example 1-17 | x |
| Example 1-18 | x |
| Example 1-19 | x |
| Comparative Example 1-1 | x |
| Comparative Example 1-2 | x |
| Comparative Example 1-3 | x |
| Comparative Example 1-4 | x |
| Comparative Example 1-5 | x |
| Comparative Example 1-6 | x |
| Comparative Example 1-7 | x |
| Comparative Example 1-8 | x |
| Comparative Example 1-9 | x |
| Comparative Example 1-10 | x |

Referring to Table 7, with respect to the secondary batteries respectively including the non-aqueous electrolyte solutions of Examples 1-1 to 1-16 containing both the lithium salt compound and the oligomer of the present disclosure, it may be understood that high-temperature storage stabilities were better than those of the secondary batteries of Comparative Examples 1-1 to 1-10 which did not include the first additive and the second additive of the present disclosure together.

With respect to the lithium secondary batteries of Examples 1-17 to 1-19 in which a somewhat smaller amount of the oligomer of the present disclosure was included, it may be understood that high-temperature stabilities were relatively decreased in comparison to those of the secondary batteries of Examples 1-1 to 1-16 as the film-forming effect was reduced.

Experimental Example 2-3: Safety Evaluation

Discharge capacity, after each of the lithium secondary batteries prepared in Examples 2-1 to 2-12 and the lithium secondary batteries prepared in Comparative Examples 1-1 and 2-1 was charged at 0.33 C rate to 4.2 V under a constant current/constant voltage condition, 0.05 C cut-off charged, and discharged at 0.33 C to 2.5 V, was set as initial capacity, and resistance in this case was set as initial resistance.

Then, after each lithium secondary battery was charged at 0.33 C rate to 4.2 V under a constant current/constant voltage condition and 0.05 C cut-off charged and each of the fully charged cells was heated to 140° C. at a rate of 5° C./min, a stability evaluation test was performed by observing whether ignition or explosion occurred while the temperature was maintained at 140° C. for 1 hour.

The results thereof are presented in Table 8 below. In this case, a case (pass), in which the battery was not ignited or exploded, was indicated as "o", and a case (fail), in which the battery was ignited or exploded, was indicated as "x".

TABLE 8

| Electrolyte solution | Stability evaluation results during high-temperature storage |
|---|---|
| Example 2-1 | o |
| Example 2-2 | o |
| Example 2-3 | o |
| Example 2-4 | o |
| Example 2-5 | o |
| Example 2-6 | o |
| Example 2-7 | o |
| Example 2-8 | o |
| Example 2-9 | o |
| Example 2-10 | o |
| Example 2-12 | o |
| Comparative Example 1-1 | x |
| Comparative Example 2-1 | x |

Referring to Table 8, with respect to the secondary batteries of Examples 2-1 to 2-12 respectively including the non-aqueous electrolyte solutions containing both the first additive and the second additive of the present disclosure, it may be understood that high-temperature storage stabilities were better than those of the secondary batteries of Comparative Examples 1-1 and 2-1.

Experimental Example 3-3: Safety Evaluation

Discharge capacity, after each of the lithium secondary batteries prepared in Examples 3-1 to 3-10 and 3-12 and the lithium secondary battery prepared in Comparative Example 3-1 was charged at 0.33 C rate to 4.2 V under a constant current/constant voltage condition, 0.05 C cut-off charged, and discharged at 0.33 C to 2.5 V, was set as initial capacity, and resistance in this case was set as initial resistance.

Then, after each lithium secondary battery was charged at 0.33 C rate to 4.2 V under a constant current/constant voltage condition and 0.05 C cut-off charged and each of the fully charged cells was heated to 140° C. at a rate of 5° C./min, a stability evaluation test was performed by observing whether ignition or explosion occurred while the temperature was maintained at 140° C. for 1 hour.

The results thereof are presented in Table 9 below. In this case, a case (pass), in which the battery was not ignited or exploded, was indicated as "o", and a case (fail), in which the battery was ignited or exploded, was indicated as "x".

TABLE 9

| Electrolyte solution | Stability evaluation results during high-temperature storage |
|---|---|
| Example 3-1 | o |
| Example 3-2 | o |
| Example 3-3 | o |
| Example 3-4 | o |
| Example 3-5 | o |
| Example 3-6 | o |
| Example 3-7 | o |
| Example 3-8 | o |
| Example 3-9 | o |
| Example 3-10 | o |
| Example 3-12 | o |
| Comparative Example 3-1 | x |

Referring to Table 9, with respect to the secondary batteries of Examples 3-1 to 3-10 and 3-12 respectively including the non-aqueous electrolyte solutions containing the oligomer and two types of cyclic carbonate compounds of the present disclosure, it may be understood that high-temperature storage stabilities were better than that of the secondary battery of Comparative Example 3-1.

The invention claimed is:

1. A non-aqueous electrolyte solution for a lithium secondary battery, comprising
a lithium salt;
a non-aqueous organic solvent;
a first additive including an oligomer including a repeating unit derived from a monomer represented by Formula 1 and a repeating unit derived from a monomer represented by Formula 2; and
a second additive including at least one selected from the group consisting of a nitrile-based compound, a lithium salt compound, and a cyclic carbonate compound,
wherein the Formulae 1 and 2 are:

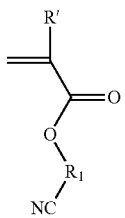

[Formula 1]

wherein, in the Formula 1,
R' is hydrogen or an alkyl group having 1 to 3 carbon atoms, and
$R_1$ is an alkylene group having 1 to 20 carbon atoms or $-(R_2)_o O(R_3)_p-$, wherein $R_2$ and $R_3$ are each independently an alkylene group having 1 to 20 carbon atoms, o is an integer of 1 to 3, and p is an integer of 0 to 3,

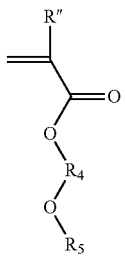

[Formula 2]

wherein, in the Formula 2,
R" is hydrogen or an alkyl group having 1 to 3 carbon atoms,
$R_4$ is an alkylene group having 1 to 10 carbon atoms, and
$R_5$ is an alkyl group having 1 to 10 carbon atoms, an aryl group having 6 to 10 carbon atoms, a heteroaryl group having 3 to 10 carbon atoms, or a cycloalkyl group having 3 to 10 carbon atoms,
wherein the lithium salt is at least one selected from $LiPF_6$, LiFSI, and LiTFSI,
wherein the lithium salt compound is at least one selected from $LiBF_4$, lithium bis(oxalato)borate, lithium difluoro(oxalato)borate, lithium difluorophosphate, or lithium difluorobis(oxalato)phosphate,
the cyclic carbonate compound is at least one selected from vinylene carbonate (VC), vinylethylene carbonate (VEC), or fluoroethylene carbonate (FEC), and
the nitrile-based compound comprises at least one selected from succinonitrile, adiponitrile, dicyanobutene, ethylene glycol bis(propionitrile)ether, hexanetricarbonitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, or 4-fluorophenylacetonitrile.

2. The non-aqueous electrolyte solution for a lithium secondary battery of claim 1, wherein the oligomer comprises an oligomer represented by Formula 3:

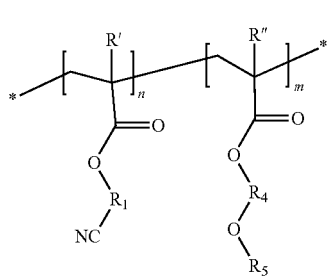

[Formula 3]

wherein, in the Formula 3,
R' and R" are each independently hydrogen or an alkyl group having 1 to 3 carbon atoms,
$R_1$ is an alkylene group having 1 to 10 carbon atoms or $-(R_2)_o O(R_3)_p-$, wherein $R_2$ and $R_3$ are each independently an alkylene group having 1 to 10 carbon atoms, o is an integer of 1 to 3, and p is an integer of 0 to 3,
$R_4$ is an alkylene group having 1 to 10 carbon atoms,
$R_5$ is an alkyl group having 1 to 10 carbon atoms, an aryl group having 6 to 10 carbon atoms, a heteroaryl group having 3 to 10 carbon atoms, or a cycloalkyl group having 3 to 10 carbon atoms, and
a molar ratio of n:m is in a range of 1:99 to 99:1.

3. The non-aqueous electrolyte solution for a lithium secondary battery of claim 2, wherein R' and R" are each independently hydrogen or an alkyl group having 1 or 2 carbon atoms,
$R_1$ is an alkylene group having 1 to 6 carbon atoms or $-(R_2)_o O(R_3)_p-$, wherein $R_2$ and $R_3$ are each independently an alkylene group having 1 to 6 carbon atoms, o is an integer of 1 to 3, and p is an integer of 0 to 3,
$R_4$ is an alkylene group having 1 to 6 carbon atoms,
$R_5$ is an alkyl group having 1 to 6 carbon atoms, an aryl group having 6 to 8 carbon atoms, a heteroaryl group having 3 to 8 carbon atoms, or a cycloalkyl group having 3 to 8 carbon atoms, and
the molar ratio of n:m is in a range of 1:99 to 99:1.

4. The non-aqueous electrolyte solution for a lithium secondary battery of claim 2, wherein R' and R" are each independently hydrogen or an alkyl group having 1 or 2 carbon atoms,
$R_1$ is an alkylene group having 1 to 6 carbon atoms or $-(R_2)_o O(R_3)_p-$, wherein $R_2$ and $R_3$ are each independently an alkylene group having 1 to 6 carbon atoms, o is an integer of 1 to 3, and p is an integer of 0 to 3,
$R_4$ is an alkylene group having 1 to 6 carbon atoms,
$R_5$ is an aryl group having 6 to 8 carbon atoms, a heteroaryl group having 3 to 8 carbon atoms, or a cycloalkyl group having 3 to 8 carbon atoms, and
the molar ratio of n:m is in a range of 1:99 to 99:1.

5. The non-aqueous electrolyte solution for a lithium secondary battery of claim 4, wherein the molar ratio of n:m is in a range of 20:80 to 90:10.

6. The non-aqueous electrolyte solution for a lithium secondary battery of claim 2, wherein the oligomer represented by Formula 3 is at least one selected from the group consisting of oligomers represented by Formulae 3A to 3F:

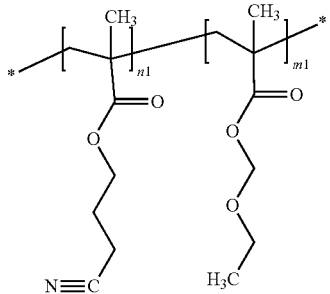
[Formula 3A]

wherein, in the Formula 3A,
a molar ratio of n1:m1 is in a range of 1:99 to 99:1,

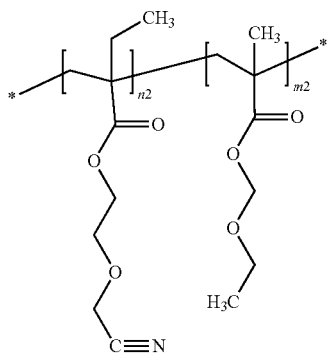
[Formula 3B]

wherein, in the Formula 3B,
a molar ratio of n2:m2 is in a range of 1:99 to 99:1,

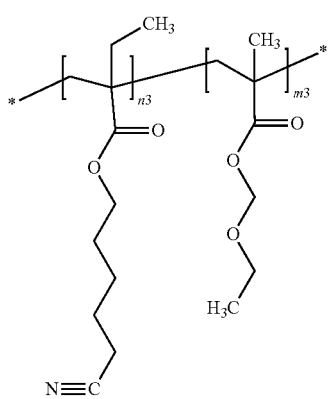
[Formula 3C]

wherein, in the Formula 3C,
a molar ratio of n3:m3 is in a range of 1:99 to 99:1,

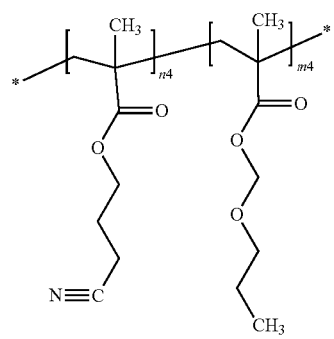
[Formula 3D]

wherein, in the Formula 3D,
a molar ratio of n4:m4 is in a range of 1:99 to 99:1,

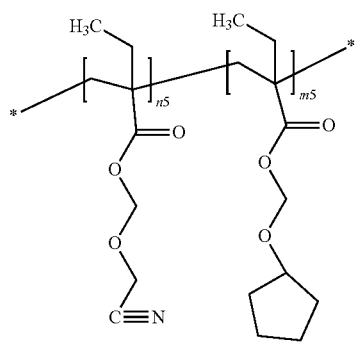
[Formula 3E]

wherein, in the Formula 3E,
a molar ratio of n5:m5 is in a range of 1:99 to 99:1,

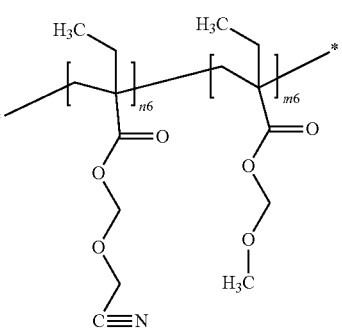
[Formula 3F]

wherein, in the Formula 3F,
a molar ratio of n6:m6 is in a range of 1:99 to 99:1.

7. The non-aqueous electrolyte solution for a lithium secondary battery of claim 1, wherein the oligomer is present in an amount of 0.1 wt % to 5 wt % based on a total weight of the non-aqueous electrolyte solution.

8. The non-aqueous electrolyte solution for a lithium secondary battery of claim 1, wherein a weight ratio of the oligomer to the nitrile-based compound is in a range of 1:0.01 to 1:100.

9. The non-aqueous electrolyte solution for a lithium secondary battery of claim 1, wherein a weight ratio of the oligomer to the lithium salt compound is in a range of 1:0.01 to 1:100.

10. The non-aqueous electrolyte solution for a lithium secondary battery of claim 1, wherein a weight ratio of the oligomer to the cyclic carbonate compound is in a range of 1:0.001 to 1:150.

11. A lithium secondary battery comprising:
a positive electrode including a positive electrode active material;
a negative electrode including a negative electrode active material;
a separator disposed between the negative electrode and the positive electrode; and
the non-aqueous electrolyte solution of claim 1.

12. The non-aqueous electrolyte solution for a lithium secondary battery of claim 1, wherein the lithium salt includes $LiPF_6$, and the non-aqueous organic solvent includes ethylene carbonate, propylene carbonate, ethyl propionate, and propyl propionate.

13. The non-aqueous electrolyte solution for a lithium secondary battery of claim 12, wherein the second additive includes the lithium salt compound, and the lithium salt compound includes lithium bis(oxalato)borate, lithium difluoro(oxalato)borate, or both.

14. The non-aqueous electrolyte solution for a lithium secondary battery of claim 12, wherein the second additive includes the nitrile-based compound, and the nitrile-based compound includes at least one selected from the group consisting of succinonitrile, adiponitrile, and dicyanobutene.

15. The non-aqueous electrolyte solution for a lithium secondary battery of claim 12, wherein the second additive includes the cyclic carbonate compound.

16. The non-aqueous electrolyte solution for a lithium secondary battery of claim 1, wherein the oligomer has a weight-average molecular weight (Mw) that is in a range of 1,000 g/mol to about 1,500,000 g/mol.

* * * * *